United States Patent

McBay

(10) Patent No.: US 10,330,348 B2
(45) Date of Patent: Jun. 25, 2019

(54) CLOSED-LOOP GEOTHERMAL ENERGY COLLECTION SYSTEM

(71) Applicant: David Alan McBay, Palo Alto, CA (US)

(72) Inventor: David Alan McBay, Palo Alto, CA (US)

(73) Assignee: David Alan McBay, Palo Alto, CA (US)

( * ) Notice: Subject to any disclaimer, the term of this patent is extended or adjusted under 35 U.S.C. 154(b) by 772 days.

(21) Appl. No.: 13/999,707

(22) Filed: Mar. 13, 2014

(65) Prior Publication Data

US 2014/0262137 A1 Sep. 18, 2014
US 2018/0372377 A9 Dec. 27, 2018

Related U.S. Application Data

(63) Continuation-in-part of application No. 13/185,266, filed on Feb. 14, 2013, now Pat. No. 9,181,931.
(Continued)

(51) Int. Cl.
*F03G 7/00* (2006.01)
*F24T 10/00* (2018.01)
*F28D 20/00* (2006.01)

(52) U.S. Cl.
CPC .......... *F24T 10/00* (2018.05); *F28D 20/0034* (2013.01); *F28D 2020/0047* (2013.01);
(Continued)

(58) Field of Classification Search
CPC . F03G 7/04; Y02E 10/10; Y02E 10/12; Y02E 10/125; Y02E 10/14; Y02E 10/16;
(Continued)

(56) References Cited

U.S. PATENT DOCUMENTS 4,204,629 A 5/1980 Bridges
4,274,575 A 6/1981 Flower
(Continued)

FOREIGN PATENT DOCUMENTS

EP 0192477 A2 8/1986
EP 1347217 A2 9/2003
(Continued)

OTHER PUBLICATIONS

Search Report and Written Opinion from EP Application 10152252.2 dated Apr. 19, 2012.
(Continued)

*Primary Examiner* — Mark Laurenzi
*Assistant Examiner* — Mickey France
(74) *Attorney, Agent, or Firm* — Perkins Coie LLP

(57) ABSTRACT

Techniques are provided for extracting geothermal energy, by providing salt into a well shaft that ends in a chamber in the Earth surrounded by a source of geothermal energy. The salt melts and heats up to the temperature within the chamber. The hot molten salt is then extracted and the heat from the molten salt is used as a source of energy to generate electricity or drive an industrial process. The salt can be re-used once the heat is extracted in a closed-loop system. According to some techniques, the salt is conveyed down the well by a pneumatic conveyer system or in other cases by using a mechanical system, such as a screw drive. Once returned to the surface, the molten salt can be used to heat graphite blocks for energy storage or be stored and transported to remote locations to extract the heat energy.

25 Claims, 28 Drawing Sheets

Related U.S. Application Data

(60) Provisional application No. 61/852,204, filed on Mar. 14, 2013, provisional application No. 61/852,201, filed on Mar. 14, 2013, provisional application No. 61/633,756, filed on Feb. 17, 2012.

(52) U.S. Cl.
CPC ............ *Y02E 10/10* (2013.01); *Y02E 60/142* (2013.01); *Y02E 70/30* (2013.01)

(58) Field of Classification Search
CPC ... Y02E 10/18; Y02E 70/30; F24J 3/08; F24J 3/081–3/086; F01K 25/00
USPC .............................................. 60/641.2–641.6
See application file for complete search history.

(56) References Cited

U.S. PATENT DOCUMENTS

| | | | |
|---|---|---|---|
| 4,642,867 A | | 2/1987 | Hough et al. |
| 4,678,113 A | | 7/1987 | Bridges et al. |
| 4,730,876 A | | 3/1988 | Werner et al. |
| 4,934,759 A | | 6/1990 | Bridges |
| 5,165,758 A | | 11/1992 | Howe |
| 5,183,197 A | | 2/1993 | Howe |
| 5,370,182 A | * | 12/1994 | Hickerson ............... E21B 43/28 |
| | | | 166/369 |
| 5,403,071 A | | 4/1995 | Hostteter et al. |
| 5,556,172 A | | 9/1996 | Howe |
| 5,994,681 A | * | 11/1999 | Lloyd ...................... F03G 6/04 |
| | | | 219/628 |
| 6,062,463 A | | 5/2000 | Hoffmueller et al. |
| 6,109,616 A | | 8/2000 | Mayr |
| 6,120,622 A | | 9/2000 | Mayr et al. |
| 6,257,588 B1 | | 7/2001 | Bagpalli et al. |
| 6,996,885 B2 | | 2/2006 | Szymbor et al. |
| 7,255,352 B2 | | 8/2007 | Adis et al. |
| 7,334,311 B2 | | 2/2008 | Addis |
| 7,653,993 B2 | | 2/2010 | Couture et al. |
| 8,051,563 B2 | | 11/2011 | Adis et al. |
| 8,069,562 B2 | | 12/2011 | Couture et al. |
| 2006/0130323 A1 | | 6/2006 | Szymbor et al. |
| 2007/0214628 A1 | | 9/2007 | Adis et al. |
| 2008/0039347 A1 | * | 2/2008 | Welton ..................... C09K 8/08 |
| | | | 507/213 |
| 2008/0122183 A1 | | 5/2008 | Braun et al. |
| 2008/0224415 A1 | | 9/2008 | Flaherty et al. |
| 2010/0108415 A1 | * | 5/2010 | Tuli ......................... B60L 11/00 |
| | | | 180/65.31 |
| 2010/0258265 A1 | * | 10/2010 | Karanikas ............. E21B 43/243 |
| | | | 165/45 |
| 2011/0113777 A1 | * | 5/2011 | De Amicis .......... F28D 20/0034 |
| | | | 60/641.8 |
| 2012/0067551 A1 | * | 3/2012 | Ganapathi ............. F28D 20/021 |
| | | | 165/104.21 |
| 2012/0080161 A1 | * | 4/2012 | Kelly ........................ F24J 2/067 |
| | | | 165/10 |
| 2012/0240577 A1 | * | 9/2012 | Mandelberg ............ F03G 6/067 |
| | | | 60/641.15 |
| 2013/0168926 A1 | | 7/2013 | Cui et al. |
| 2013/0224104 A1 | * | 8/2013 | Naterer ..................... C01B 3/08 |
| | | | 423/648.1 |

FOREIGN PATENT DOCUMENTS

| | | |
|---|---|---|
| JP | 2000503374 A | 3/2000 |
| JP | 2006132773 A | 5/2006 |
| RU | 1462917 A1 | 11/1996 |

OTHER PUBLICATIONS

Unofficial English translation of JP Office Action dated Jan. 28, 2014, issued in connection with corresponding JP Application No. 2010-020822.

EP Search Report and Written Opinion dated Jan. 30, 2012 from corresponding EP Application 10152252.2.

\* cited by examiner

CLOSED-LOOP GEOTHERMAL ENERGY COLLECTION SYSTEM

CROSS-REFERENCE TO RELATED APPLICATIONS

This Patent Application is a continuation-in-part of U.S. patent application Ser. No. 13/815,266, entitled GEOTHERMAL ENERGY COLLECTION SYSTEM, filed Feb. 14, 2013, the contents of which are incorporated by reference herein in their entirety, and which in turn claims the benefit of U.S. Provisional Patent Application No. 61/633,756, filed on Feb. 17, 2012, the contents of which are also incorporated herein by reference in their entirety. This Patent Application also claims the benefit of U.S. Provisional Patent Application No. 61/852,204, entitled A CLOSED LOOP GEOTHERMAL ENERGY COLLECTION SYSTEM, filed on Mar. 14, 2013, and U.S. Provisional Patent Application No. 61/852,201, entitled STORAGE SYSTEMS FOR GEOTHERMAL ENERGY EXTRACTION, filed on Mar. 14, 2013, both of which are hereby incorporated by reference in their entirety.

FIELD OF THE INVENTION

This invention relates to the field of geothermal energy extraction, and more specifically to the process of extracting heat from wells drilled into the Earth and using the extracted heat for an industrial process, such as the generation of electricity, or to drive a chemical or other manufacturing process. In particular, it relates to a closed-loop system, in which a thermal transfer material is injected into the Earth, extracted once it has acquired heat, imparts its heat to a useful process, and then re-injected into the Earth.

BACKGROUND OF THE INVENTION

Mankind has used geothermal energy for millennia. It is known that human tribes of the Neolithic Age bathed in natural hot springs, and the ancient Chinese and Roman civilizations built facilities to harness geothermal pools. With the core of the Earth believed to be over 5,000° C., it has been estimated that there is enough heat stored from the original formation of the Earth and generated by ongoing radioactive decay to meet mankind's energy needs for any foreseeable future.

The usual problems encountered in attempting to utilize geothermal energy have been practical ones of access, since the surface of the Earth is much cooler than the interior. The average geothermal gradient is about 25° C. for every kilometer of depth. This means that the temperature at the bottom of a well 5 km deep can be expected to be at a temperature of 125° C. or more. Oil companies now routinely drill for oil at these depths, and the technology required to create holes of this magnitude in the Earth is well known. (The deepest oil well at this time is over 12 km deep.) Wells of this depth, however, can be very expensive, costing over $10M to drill.

However, near geological fault zones, fractures in the Earth's crust allow magma to come much closer to the surface. This gives rise to familiar geothermal landforms such as volcanoes, natural hot springs, and geysers. In the seismically active Long Valley Caldera of California, magma at a temperature more than 700° C. is believed to lie at a depth of only 6 km. Alternatively, if lower temperatures can be utilized, a well dug to a depth less than 1 km in a geothermal zone can achieve temperatures over 100° C. A well 1 km deep often can cost much less than $1M to drill.

Electricity generation from geothermal energy was first demonstrated in Italy in 1904, but it was only in the 1950s that the first commercial operations began. The initial approach, such as that used at the Geysers facilities in Sonoma and Lake Counties, California, relies on natural steam within the Earth. At the Geysers, wells about 1-2 km deep penetrate the cap rock into a stratum containing magma-heated steam at a temperature of about 170° C. and a pressure of about 700 kPa (about 7 atm). The naturally high-pressure steam pushes to the surface through the well, and is directed to drive turbines to generate electricity. The water at the end is discarded as wastewater.
(For more, see <http://www.geysers.com/>.)

A more ambitious multi-year project in Iceland, the Iceland Deep Drilling Project (IDDP) along the mid-Atlantic ridge plans to drill wells 5 km deep to tap into a source of 500° C. hot supercritical hydrous fluid at about 220 atm in pressure.
(For more, see <http://iddp.is/about/>.)

Both of these projects tap into naturally existing geothermal pools of steam or superheated fluid. Such a system, often called a geothermal well, has its advantages in that the steam is naturally under pressure, and is replenished from a reservoir of groundwater. However, this technique can only be used in locations where there is magma nearer the surface to provide heat, where there is a steady supply of ground water to become pressurized steam, and a solid cap rock to keep the steam confined and under pressure. These conditions restrict the applicability of this method to relatively few geographic sites.

More recent methods to utilize geothermal energy in hot, dry rock are called enhanced geothermal systems, or EGS. [See *The Future of Geothermal Energy: Impact of Enhanced Geothermal Systems (EGS) on the United States in the 21$^{st}$ Century*, MIT Report, 2006, at <http://www1.eere.energy.gov/geothermal/egs_technology.html>.]
In such a system all that is needed is for a pool of geothermal heat to exist at a depth where wells can be economically produced. In an EGS setup, a first well is drilled several kilometers deep and large volumes of water injected down into the hot rock. The water can be injected at temperatures that fracture the lower hot rock to make it more permeable. This process is called hydraulic fracturing, or "fracking". The water being pumped into the injection well is then heated below the surface to become steam, and pumped out in a second well. This method for generating electricity is therefore similar to the previously described traditional geothermal technique, except in EGS the water is supplied by the system. The spent water, once the heat has been extracted to generate electricity, is re-injected into the injection well.

FIG. 1 illustrates a prior art EGS system. At or near the surface of the Earth 10, an EGS facility 12 provides a pumping system that injects water into the Earth and pumps water/steam from the Earth once heated. An injection well 14 extends into the Earth to a depth significantly hotter than the surface 10. The region of the Earth at this hotter temperature is designated a thermal pool 560. Water is then injected from the EGS facility 12 into the injection well 14, where it disperses into the thermal pool 560. Sometimes, the water is injected at such pressures that it causes a network of fractures 570 in the hot rock of the thermal pool 560, making it more permeable to water, and increasing the surface area of the rock in order to heat the water more quickly. Once the water is heated in the thermal pool 560, it is pumped out the production well 16, either as superheated water or as supercritical steam. The heated water/steam is used to drive a production facility 20 to generate electricity.

EGS can be used anywhere there is a suitable stratum of hot rock at accessible depths, as long as there is a supply of water to initiate the process and to replenish what is lost. Because the water/steam brought to the surface is intended to be recaptured once the heat is extracted and re-injected into the injection well, this is called a closed loop system. It is proving a popular alternative for geothermal energy, notably because it can be used in far more geographic sites than traditional geothermal wells.

EGS geothermal energy production facilities are being developed by several companies, including AltaRock Energy, Inc. of Seattle, Wash. AltaRock Energy Inc. has several issued patents on their technology, such as U.S. Pat. No. 8,109,094 (SYSTEM AND METHOD FOR AQUIFER GEO-COOLING by S. Petty, filed Apr. 30, 2009 and issued Feb. 7, 2012); and U.S. Pat. No. 8,272,437 (ENHANCED GEOTHERMAL SYSTEMS AND RESERVOIR OPTIMIZATION by D. Bour and S. Petty, filed Jul. 7, 2009 and issued Sep. 25, 2012); and has several applications pending, such as U.S. Patent Application Ser. No. 12/432,306 (SYSTEM AND METHOD FOR USE OF PRESSURE ACTUATED COLLAPSING CAPSULES SUSPENDED IN A THERMALLY EXPANDING FLUID IN A SUBTERRANEAN CONTAINMENT SPACE by D. Bour, filed Apr. 29, 2009);

Ser. No. 12/433,747 (METHOD AND COOLING SYSTEM FOR ELECTRIC SUBMERSIBLE PUMPS/MOTORS FOR USE IN GEOTHERMAL WELLS by S. Petty, filed Apr. 30, 2009);

Ser. No. 12/538,673 (METHOD FOR TESTING AN ENGINEERED GEOTHERMAL SYSTEM USING ONE STIMULATED WELL by S. Petty, P. Rose and L. Nofziger, filed Aug. 10, 2009);

Ser. No. 12/754,483 (METHOD FOR MODELING FRACTURE NETWORK, AND FRACTURE NETWORK GROWTH DURING STIMULATION IN SUBSURFACE FORMATIONS, by S. Petty, M. Clyne and T. Cladouhos, filed Apr. 5, 2010);

Ser. No. 12/791,735 (SYSTEM AND METHOD FOR DETERMINING THE MOST FAVORABLE LOCATIONS FOR ENHANCED GEOTHERMAL SYSTEM APPLICATIONS, by S. Petty, O. Callahan, M. Clyne and T. Cladouhos, filed Jun. 1, 2010);

Ser. No. 13/326,285 (HIGH TEMPERATURE TEMPORARY DIVERTER AND LOST CIRCULATION MATERIAL by D. Bour, L. Watters, S. Petty and A. Apblett, filed Dec. 14, 2011); and Ser. No. 13/342,924 (SYSTEM AND METHOD FOR AQUIFER GEO-COOLING by S. Petty, filed Jan. 3, 2012);

which may be considered prior art for the invention disclosed in this application.

However, there are some drawbacks to such prior art systems using EGS. First, energy must be expended both to force water down into the injection well, and to pump the heated water/steam from within the Earth. Although the energy produced can still be significantly larger, it is an additional, ongoing cost. Second, EGS requires very large quantities of water to serve the needs of the injection well. In the western United States, the most likely area to deploy EGS because geothermal resources can be tapped with shallower wells, water is scarce and coveted resource. In those areas where sufficient water is available, additional problems arise due to the ultimate pollution of that water due to the minerals, salts and other toxic elements injection well water concentrates as it moves through the EGS cycle. Third, "Fracking" in the Earth at the bottom of the injection well can release methane, contaminating groundwater, and creates seismic events, which can sometimes be felt at the surface as earthquakes. A recent EGS project in Switzerland was suspended and ultimately cancelled due to strong seismic events (including a magnitude 3.4 earthquake) in the nearby city of Basel triggered by the injection well [see, for example, Domenico Giardini, "Geothermal quake risks must be faced", *Nature* vol. 463, p. 293 (January 2010)].

FIG. 2 illustrates a prior art alternative approach to mining heat from dry hot rock as proposed by GTherm Inc. of Westport, Conn. In the prior art GTherm system, as in EGS, a surface facility 12-1 at the surface of the Earth 10 provides a pumping system 18-1 to inject water into the Earth through injection piping 14-1, and to pump water/steam from the Earth through production piping 16-1 once heated. However, in the GTherm system, a single well shaft 11-1 with a well head 15-1 extends into the Earth to the thermal pool 560, and contains both the injection piping 14-1 and the production piping 16-1. At the base of the well shaft, using underground drilling techniques such as potter drilling, developed by Potter Drilling Inc. of Redwood City, Calif. and described in part in U.S. Pat. No. 8,235,140 (METHOD AND APPARATUS FOR THERMAL DRILLING by T. Wideman, J. Potter, D. Dreesen and R. Potter, filed Oct. 8, 2009 and issued Aug. 7, 2012), a chamber 580 in the rock is formed surrounded by the thermal pool 560, and them sealed with a coating 590 of a special proprietary grout. This chamber 580 with coating 590 forms what GTherm designates a "Heat Nest".

Water is then injected through the injection piping 14-1 into the chamber 580 with coating 590, creating a reservoir of liquid 550. This liquid 550 heats up, and is then pumped out of the same well shaft 11-1 through the production piping 16-1, either as superheated water or as steam. As in the previous EGS configuration, the heated water/steam is used to drive a production facility 20-1 to generate electricity.

This modified, single well EGS (SWEGS) closed loop approach of GTherm has some advantages over conventional EGS. First, once the heat nest has been formed, no fracturing of the bedrock need occur, meaning no seismic events will occur to disturb surface residents. Second, the water remains confined in the heat nest, and does not mix with local water sources or become contaminated with minerals or organic compounds from the local soil. Third, since the water used in the thermal loop does not mix with the local sources of groundwater, groundwater contamination does not occur unless there is damage or a leak to piping in the well shaft.

Several patent applications have been filed on this SWEGS technology, including U.S. Patent Application Ser. No. 12/456,434 (SYSTEM AND METHOD OF CAPTURING GEOTHERMAL HEAT FROM WITHIN A DRILLED WELL TO GENERATE ELECTRICITY by M. Parrella, and filed Jun. 15, 2009; and Ser. No. 12/462,656 (CONTROL SYSTEM TO MANAGE AND OPTIMIZE A GEOTHERMAL ELECTRIC GENERATION SYSTEM FROM ONE OR MORE WELLS THAT INDIVIDUALLY PRODUCE HEAT);

Ser. No. 12/462,657 (SYSTEM AND METHOD OF MAXIMIZING HEAT TRANSFER AT THE BOTTOM OF A WELL USING HEAT CONDUCTIVE COMPONENTS AND A PREDICTIVE MODEL);

Ser. No. 12/462,658 (SYSTEM AND METHOD OF MAXIMIZING GROUT HEAT CONDUCTIBILITY AND INCREASING CAUSTIC RESISTANCE); and Ser. No. 12/462,661 (SYSTEM AND METHOD OF MAXIMIZING PERFORMANCE OF A SOLID-STATE CLOSED LOOP WELL HEAT EXCHANGER), all by M. Parrella and filed Aug. 5, 2009.

Although the SWEGS variation does offer improvements over conventional EGS, it still uses water as the fluid to carry heat from the thermal pool to the surface. As illustrated in Table I, if the temperature in the thermal pool is below 100° C., liquid water has a large energy density, and can do an efficient job of bringing heat to the surface. Water has a specific heat of 4.187 kJ/(kg ° C.) and a density of 1,000 kg/m$^3$, giving an appreciable energy density of 4,187 kJ/(m$^{3}$° C.). However, at a pressure of 1 atmosphere (1 atm, also 1.01 bar or 101 kPa) the temperature of liquid water is at most 100° C., and therefore the amount of heat that can be raised with each kilogram of water is limited by its boiling point.

TABLE I

Table I: Specific Heat, typical Mass Density, and Energy Density of water, steam, and various other substances.

| | Specific Heat kJ/(kg ° C.) | Mass Density kg/m$^3$ | Energy Density kJ/(m$^3$ ° C.) |
|---|---|---|---|
| Water (20° C.) | 4.187 | 1,000 | 4,187 |
| Superheated Water (161 atm, 350° C.) | 8.138 | 579 | 4,712 |
| Steam (1 atm, 100° C.) | 2.027 | 0.59 | 1.2 |
| Superheated Steam (10 atm 350° C.) | 1.623 | 3.95 | 6.4 |
| Uranium | 0.120 | 19,100 | 1,292 |
| Granite | 0.790 | 2,700 | 2,133 |
| Molten Salt (142-540° C.) | 1.560 | 1,680 | 2,621 |
| Aluminum (#6061) | 1.256 | 2,710 | 3,404 |
| Cast Iron | 0.456 | 7,920 | 3,612 |
| Stainless Steel (Grade 316) | 0.502 | 8,027 | 4,030 |

Sources:
Water: http://www.engineeringtoolbox.com/water-thermal-properties-d_162.html
Supercritical Water: www.isa.org/~birmi/magnetrol/Technical_Handbook.pdf
Steam: http://www.thermexcel.com/english/tables/vap_eau.htm
Superheated Steam: http://www.spiraxsarco.com/esc/SH_Properties.aspx
Salt/Metals: http://www.engineeringtoolbox.com/sensible-heat-storage-d_1217.html
Steel: http://www.engineersedge.com/properties_of_metals.htm Water can be superheated under pressure, and can have a boiling point as high as 374° C. under a pressure of 214 atm. Table I also shows the energy density achievable for water superheated to 350° C. If the production well is suitably airtight and pressurized, higher temperatures can be maintained, and with the greater temperature increase, significantly more heat can be pumped to the surface when superheated water is used. However, such high-pressure plumbing systems for a well several kilometers below the surface can be difficult to maintain. Also, superheated water can be a much better solvent for larger organic compounds, particularly if they have some polar groups or contain aromatic compounds, increasing the risk of contamination in the system. Therefore, superheated water can be more corrosive than water at ordinary temperatures, and at temperatures above 300° C. special corrosion resistant alloys may be required for the well casing, depending on the composition of the dissolved components.

An alternative to using superheated water is to allow the water underground to boil and become steam. Extreme pressures need not be maintained to control the flow of the steam at temperatures that can be significantly hotter than 100° C. But, as shown in Table I, the energy density of steam is significantly lower than liquid water. Even though the specific heat (2.027 kJ/(kg ° C.)) is smaller by only a factor of 2, the much lower density (typically 0.6 kg/m$^3$) of normal steam means the same volume of steam holds 3,500 times less heat than liquid water. Supercritical heating of steam, increasing the temperature and pressure, can increase the volumetric energy density somewhat, but typically not by more than a factor of 10, and then the problems of managing an extremely hot fluid under pressure are reintroduced.

Table I also compares the energy density possible with water and steam with a few other materials, notably molten salt (heated above 142° C.) and several metals. These support an energy density much higher than that of steam for cases where the thermal pool is hotter than 100° C., especially for the case of stainless steel, where the energy density approaches water again.

There is therefore a need for a geothermal system which can operate as a closed loop system without causing seismic damage or groundwater contamination, but which also allows for a substance with a large volumetric energy density to be used to absorb heat inside the Earth from depths where the temperature is greater than 100° C., coupled with an efficient means to bring the heated substance to the surface of the Earth for thermal harvesting.

BRIEF SUMMARY OF THE INVENTION

The invention disclosed with this application is a method of extracting energy from the Earth. There are many embodiments of the invention disclosed here. Several embodiments of the invention comprise the insertion of a thermal mass into a Heat Absorption Zone, having the thermal mass absorb heat while in the Heat Absorption Zone, raising the thermal mass to a Heat Transfer Zone, and transferring the heat from the thermal mass.

In some embodiments of the invention, the thermal mass comprises internal chambers filled with a liquid thermal absorber such as molten salt, and the transfer of heat comprises transferring the heated liquid thermal absorber out of the thermal mass.

In some embodiments of the invention, the thermal mass comprises structures to facilitate heat exchange with a thermal exchange fluid, and the transfer of heat comprises flowing an exchange fluid through the thermal mass.

In some embodiments of the invention, the thermal mass is balanced with a counterweight. In some embodiments of the invention, the counterweight is another thermal mass.

In some embodiments of the invention, the heat transferred from the thermal mass can be utilized for a number of possible industrial processes, including generating electricity.

In some embodiments of the invention, a solid material, such as a salt mixture, is transported into a Heat Absorption Zone, where it absorbs heat and melts. The hotter melted material is then raised to a Heat Transfer Zone, and the heat is transferred from the material and used to drive a number of possible industrial processes, including generating electricity. The means of transport to the Heat Absorption Zone can be a free fall under gravity in some embodiments, a pneumatic conveyor system in some embodiments, or a mechanical system comprising a driving screw and/or a ram screw system in other embodiments.

Some embodiments of the invention additionally provide a means for collecting energy generated as a thermal mass descends into a heat well.

In some embodiments of the invention, the potential energy of the thermal mass at the top of the well is converted to electricity and supplied to an electrical grid. In an alternative embodiment, the generated electrical energy can also be stored in a battery.

In another embodiment of the invention, geothermal heat is brought to the surface using molten salt, which is then used to transfer the heat for storage in a graphite block or pod. The heat in the graphite pod can in turn be used to power a vehicle, or be transported to provide energy at a remote location.

Note that the illustrations provided are for the purpose of illustrating how to make and use the invention, and are not to scale. The wells are anticipated to be kilometers deep, while the thermal masses are expected to be typically 50 centimeters to 30 meters long and from 10 to 100 centimeters in diameter, and can be scaled to be other sizes and shapes if desired.

DETAILED DESCRIPTIONS OF
EMBODIMENTS OF THE INVENTION

What follows are detailed descriptions of several embodiments of the invention, including embodiments believed by the inventor to be the best mode.

Figure 1:
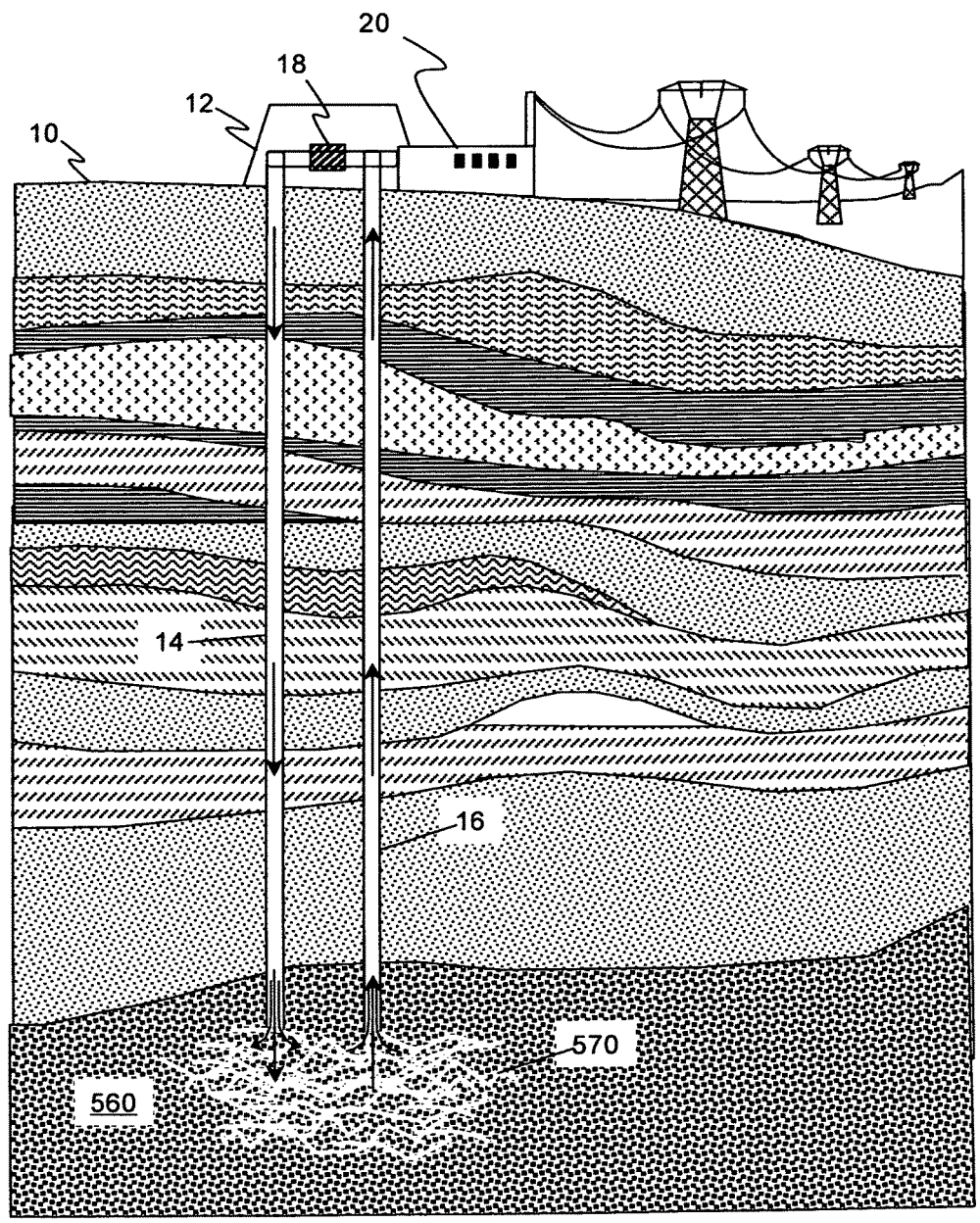
FIG. 1 presents a schematic overview of an example of prior art enhanced geothermal systems (EGS) for geothermal energy extraction.
Figure 2:
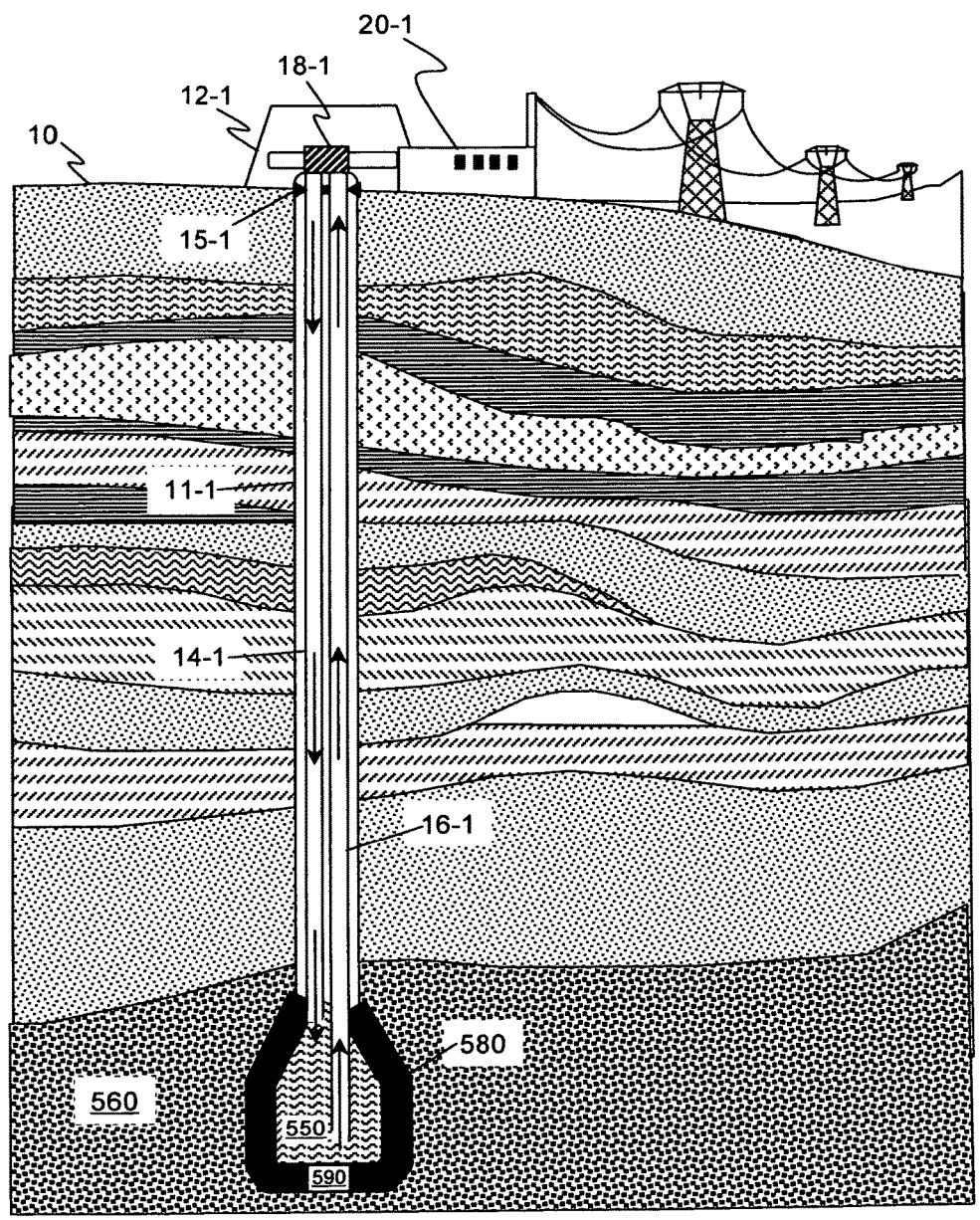
FIG. 2 presents a schematic overview of a prior art single-well enhanced geothermal system (SWEGS) using a thermal nest for geothermal energy extraction.
Figure 3:
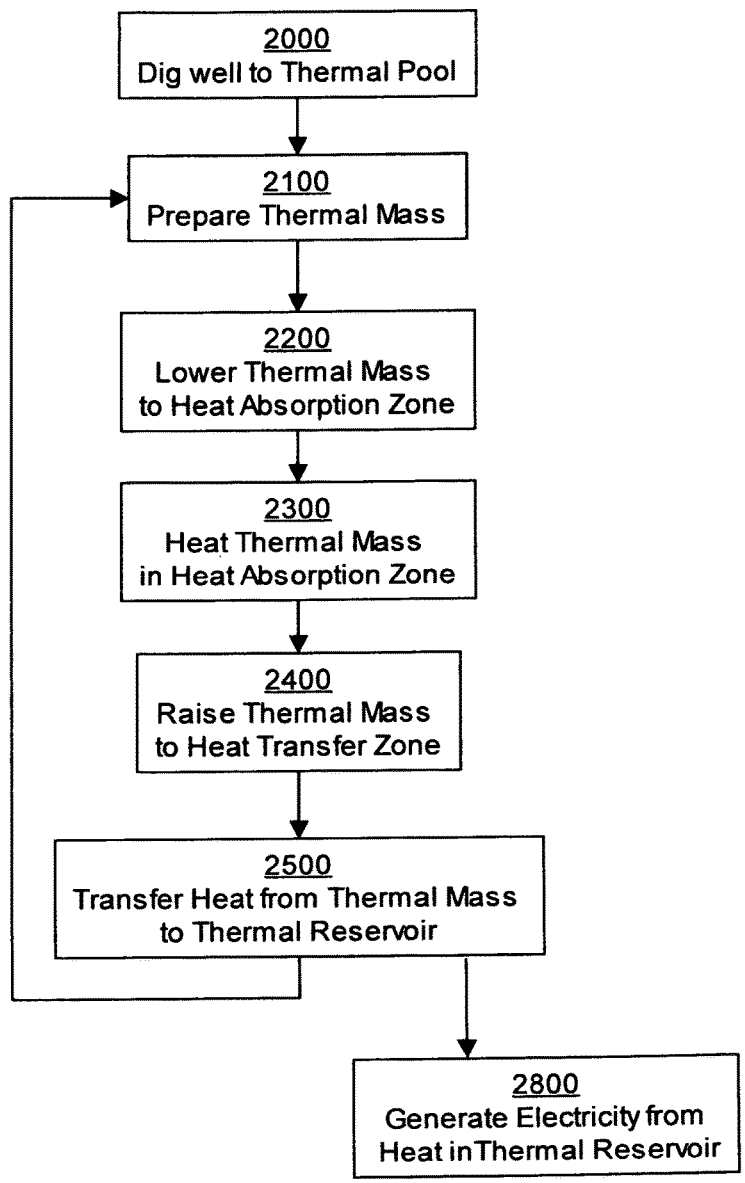
FIG. 3 presents a flow diagram of the thermal extraction process according to several embodiments of the invention.
Figure 4:
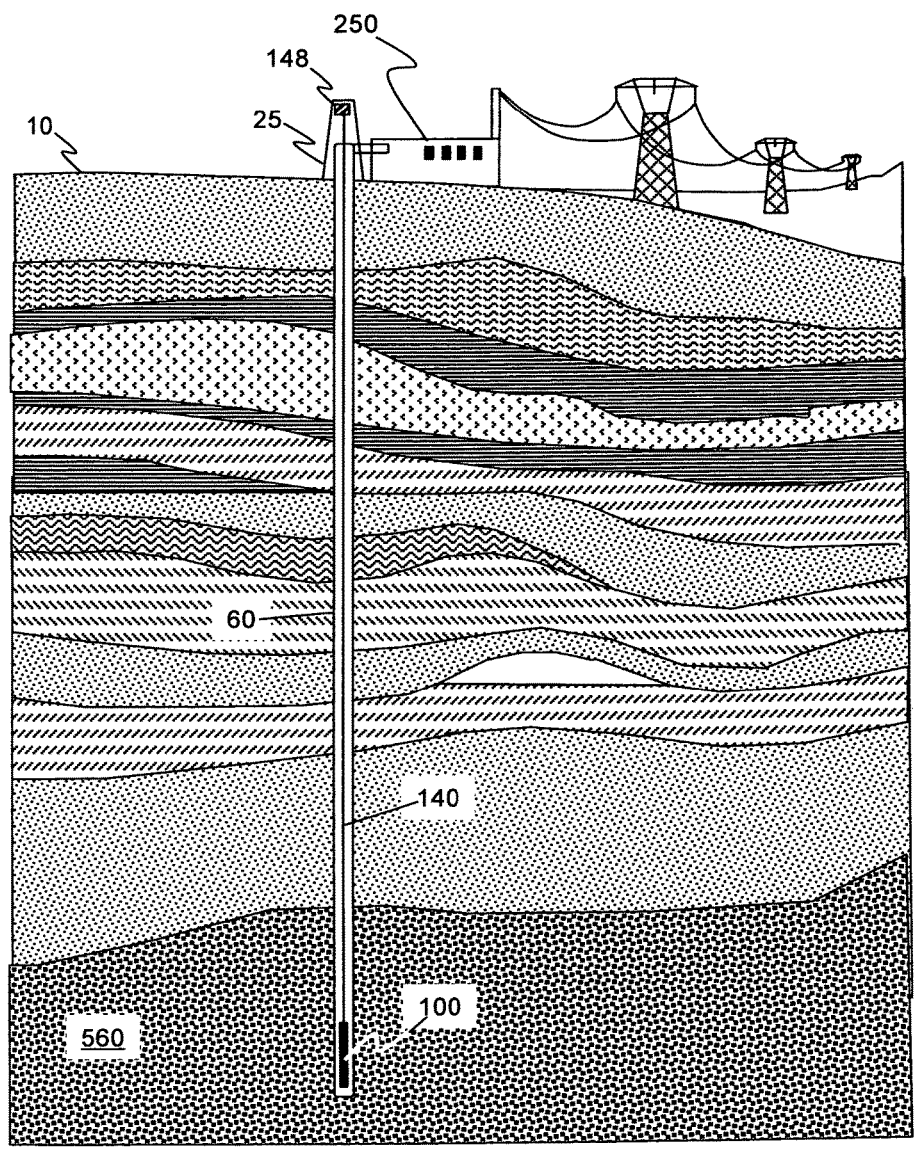
FIG. 4 presents a schematic overview of one embodiment of the invention.

Common to many embodiments of the invention are the steps illustrated in the flow diagram of FIG. 3 and the overview illustration shown in FIG. 4. To start, as shown in FIG. 3, the initial step 2000 comprises digging a well shaft 60 into the Earth, until a portion of the well shaft 60 is surrounded by a thermal pool 560. It should be noted that some embodiments of the invention could be implemented in a pre-existing well, so that a new well shaft 60 need not be dug for each installation.

In the second step 2100, a thermal mass 100 is then prepared with a procedure that typically comprises attaching it to a suspension cable 140 which in turn is attached to a control system 148 for raising and lowering the thermal mass 100. Once the thermal mass has been prepared, in the next step 2200 the thermal mass 100 is then lowered down the well shaft 60 until it reaches the thermal pool 560. This region is designated the Heat Absorption Zone. The next step 2300 comprises allowing the thermal mass 100 to remain in the Heat Absorption Zone until a desired temperature is reached or a predetermined amount of heat has been absorbed by the thermal mass 100. The illustration in FIG. 4 represents the process at this point.

After this, the next step 2400 comprises raising the heated thermal mass 100 to an area designated the Heat Transfer Zone, typically near the surface of the Earth 10. The next step 2500 comprises extracting the heat energy from the thermal mass 100 and transferring it to a thermal reservoir 200. After this, the thermal mass 100 can be prepared again according to a repetition of the second step 2100 and the subsequent steps 2200 through 2500 repeated, and the cycle continues.

At the same time, according to alternative step 2800, the heat energy transferred into the thermal reservoir 200 can be used in a production facility 250 for a number of useful processes, such as generating electricity, driving another industrial process such as pyrolysis, or simply being stored for later use. A housing 25 or other structure to protect the well shaft 60 from the elements can also be constructed, either independent of, or in connection with the production facility 250.

For the purposes of this description, the term "thermal mass" can be any discrete object, whether it be solid, hollow, liquid filled, etc. that has a mass and a heat capacity and is prepared for insertion into the thermal well. It can be a simple slug of metal, chosen for its heat capacity, or a more complex structure with internal mechanisms, piping and structures, and may additionally comprise reservoirs of fluids and plumbing to facilitate the transfer of heat by the transfer of fluids into and out of the thermal mass. It may also contain chambers or other structures to facilitate an internal chemical process.

The preparation of the thermal mass can be a procedure as simple as attaching it to a cable for suspension. However, if there are more complex internal structures, such as internal piping and reservoirs, the preparation can also comprise checking the temperatures, pressures, fill levels and purity of fluids in the chambers, the distribution of mass, making an exchange of fluids needing replacing, confirming the condition of the seals on the valves and connectors, corrosion, inspection for cracks or other damage on the external shell or the suspension cables, determining the security of any hoses and seals, the calibration of any gauges or data sensors, etc.

For the purposes of this description, the term "thermal pool" refers to a portion of the Earth underground that is significantly hotter than at the surface, and which therefore provides a source of energy. Although the thermal pool as described in the embodiments of the invention disclosed here will generally be a stratum of hot dry rock as might be used in the prior art EGS configurations, these embodiments may also be applied to any geothermal heat source, including to wells which extend deep enough to encounter molten rock or magma within the Earth.

For the purposes of this description, the term "thermal well" refers to the Heat Absorption Zone, and describes a structure created in the Earth, typically by drilling a hole, in which at least a portion of the structure, typically the bottom, is in the thermal pool, and is therefore naturally at a significantly hotter temperature than is found on the surface of the Earth. When an object, such as the thermal mass, is inserted into the thermal well and left there, the object heats up as it is surrounded by the thermal pool.

A First Embodiment of the Invention

Figure 5:
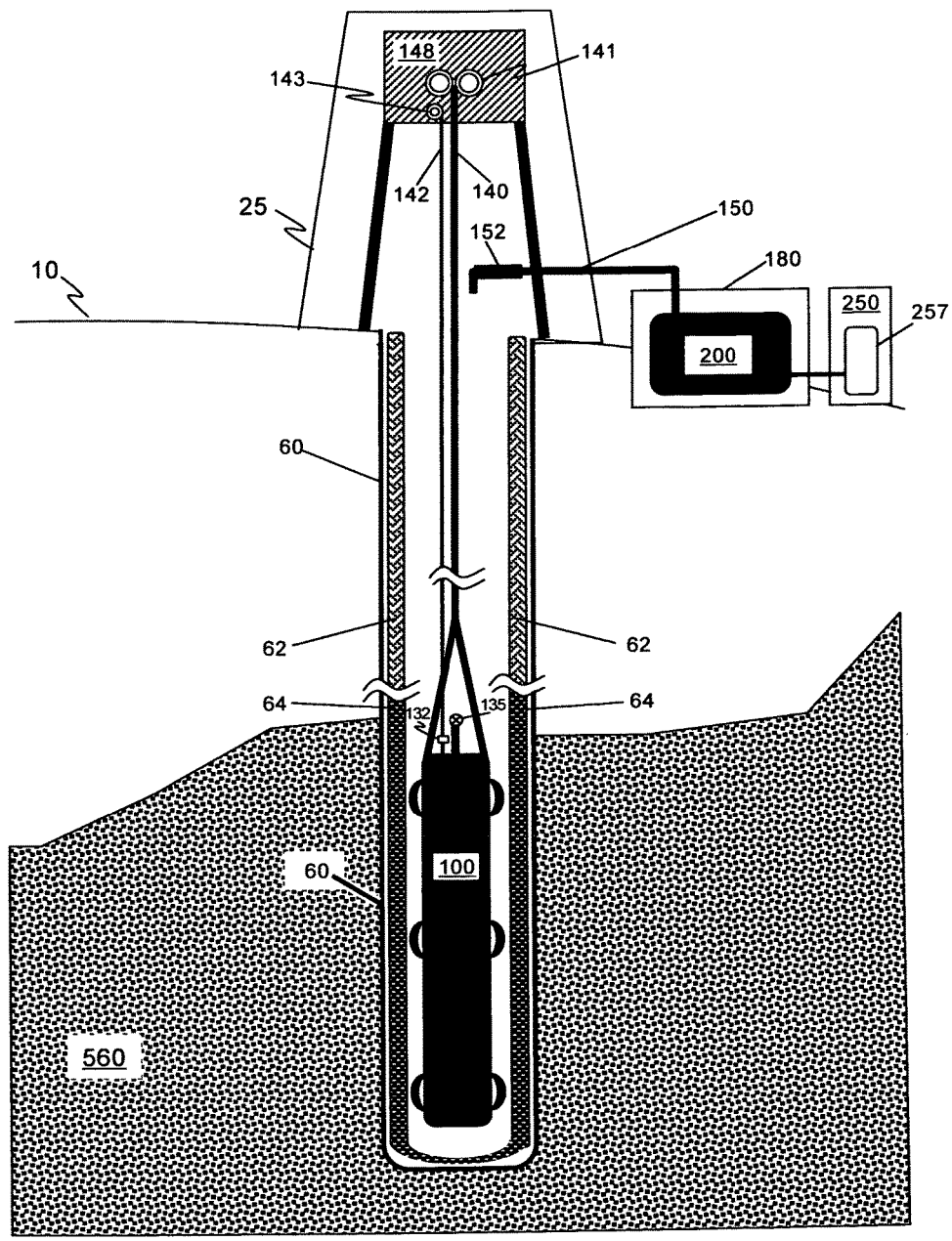
FIG. 5 presents in more detail a cross section view of an embodiment of the invention in which a thermal mass is being heated.
Figure 6:
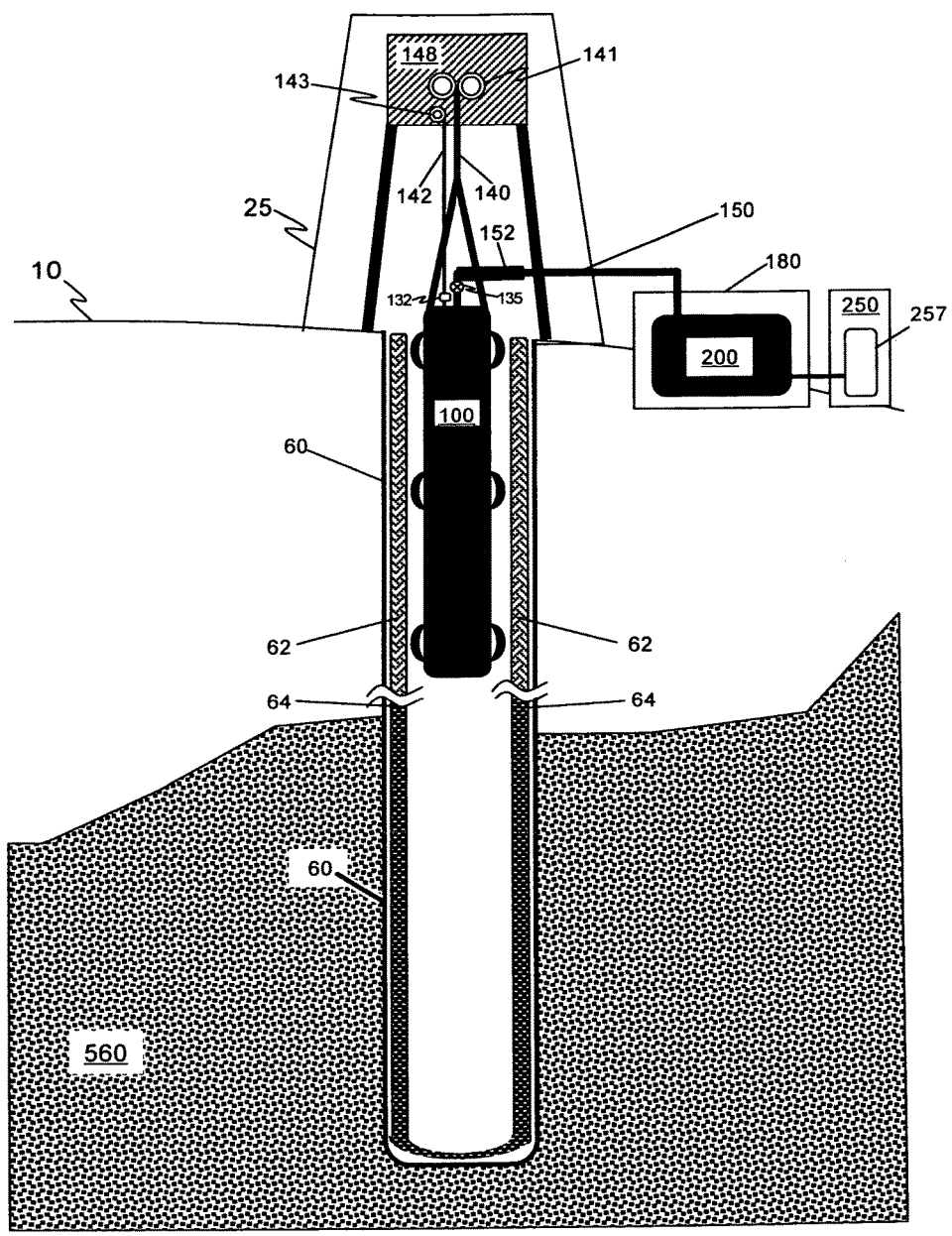
FIG. 6 presents in more detail a cross section view of the embodiment of the invention shown in FIG. 5 in which the thermal mass has been raised to the surface and heat is being transferred from thermal mass to a thermal reservoir.

One embodiment of the invention is illustrated in more detail in FIG. 5 and FIG. 6. Note that these illustrations are not to scale, since the wells are anticipated to be kilometers deep while the thermal masses are expected to be, for example, 1 to 30 meters long and perhaps 50 to 100 centimeters in diameter.

In this embodiment of the invention, the deeper part of the well shaft 60 surrounded by the thermal pool 560, can be lined with a thermal casing 64 that facilitates the transfer of heat from the thermal pool 560 to the thermal mass 100. This thermal casing can be made using a material such as a thermally conducting grout, often made from compositions comprising water, cement, siliceous gel, and sometimes bentonite. Additional materials such as iron filings or other metallic powders can be mixed into the grout to enhance thermal conductivity. The surface can also be treated to be smooth to increase emissivity for enhancing radiative heat transfer. Although the well shaft as shown is a simple vertical hole, the well shaft can have more complex structures such as varying diameters, chambers situated at various positions along the shaft, or side tunnels.

Likewise, the upper part of the well shaft 60, which is at cooler temperatures, can be lined with an insulating casing 62 that prevents heat from the thermal mass 100 from dissipating before it reaches the top of the well shaft 60. This insulating casing can be made using a material such as solid concrete, porous concrete, tubing walls of ⅜" thick stainless steel, or a layered structure of concrete and steel. For insulation in high heat situations, a weave of basalt fabrics such as those manufactured by Smarter Building Systems of Newport, R.I. may provide an adequate insulating casing. Other fiber products comprising ceramic or silica materials can also be used.

The system also comprises suspension mechanism such as a suspension cable 140 or other suspension rigging that suspends the thermal mass 100 in the well shaft 60. The suspension cable 140 can be attached to a suspension mechanism 141 for raising and lowering the suspension cable 140 and the attached thermal mass 100, which in turn is managed by a control system 148. The system can also comprise an additional communication cable 142 with a data connector 132 to sensors in the thermal mass 100 that provide data about variables of interest such as temperature, thermal expansion, distribution of mass, etc. This communication cable 142 can be managed using independent mechanism 143 that winds and unwinds the communication cable 142 as the thermal mass 100 is lowered and raised. In some embodiments, the communication cable can instead be integrated into the suspension cable 140, and raised and lowered using the suspension mechanism 141. A housing 25 can be provided to protect the machinery for raising and lowering the thermal mass 100 from the elements.

In some embodiments of the invention, a thermal transfer system in the Heat Transfer Zone will also be provided to unload the heat in the thermal mass 100. In some embodiments, heated fluid from the thermal mass 100 is transferred through a thermal transfer conduit 150, which can in some embodiments have a moving or telescoping junction 152 to connect with the thermal mass 100 using a thermal fluid connector 135. The heated fluid is then transferred to a thermal reservoir 200 contained in a thermal reservoir containment 180. The heat in the thermal reservoir 200 is then used to generate electricity or drive an industrial process in a production facility 250, which can comprise a means for generating electricity 257 or other production equipment.

In some embodiments of the invention, the heat can be transferred by detaching the thermal mass 100 from the suspension cable 140 and placing the hot thermal mass 100 into a thermal reservoir 200 for subsequent thermal transfer. If the thermal mass 100 is designed as a simple slug of metal with a large heat capacity, this transfer can comprise placing the hot thermal mass into a fluid bath in the thermal reservoir 200, in which the heat is transferred from the thermal mass to the fluid in the bath. If the thermal mass 100 is a metallic structure with more complex internal structures, such as internal tubes that facilitate fluid flow for heat transfer through the thermal mass 100, the thermal mass 100 can be attached to a plumbing system that provides fluid that removes the heat from the inside of the thermal mass 100 as it passes through the various internal tubes.

In the meantime, while the initial thermal mass 100 is transferring heat in the Heat Transfer Zone, an alternate thermal mass, which will typically be an object with dimensions and a construction similar to the initial thermal mass 100, can be attached to the suspension cable 140 and lowered into the well shaft 60 to begin heating in the Heat Absorption Zone.

Figure 7:
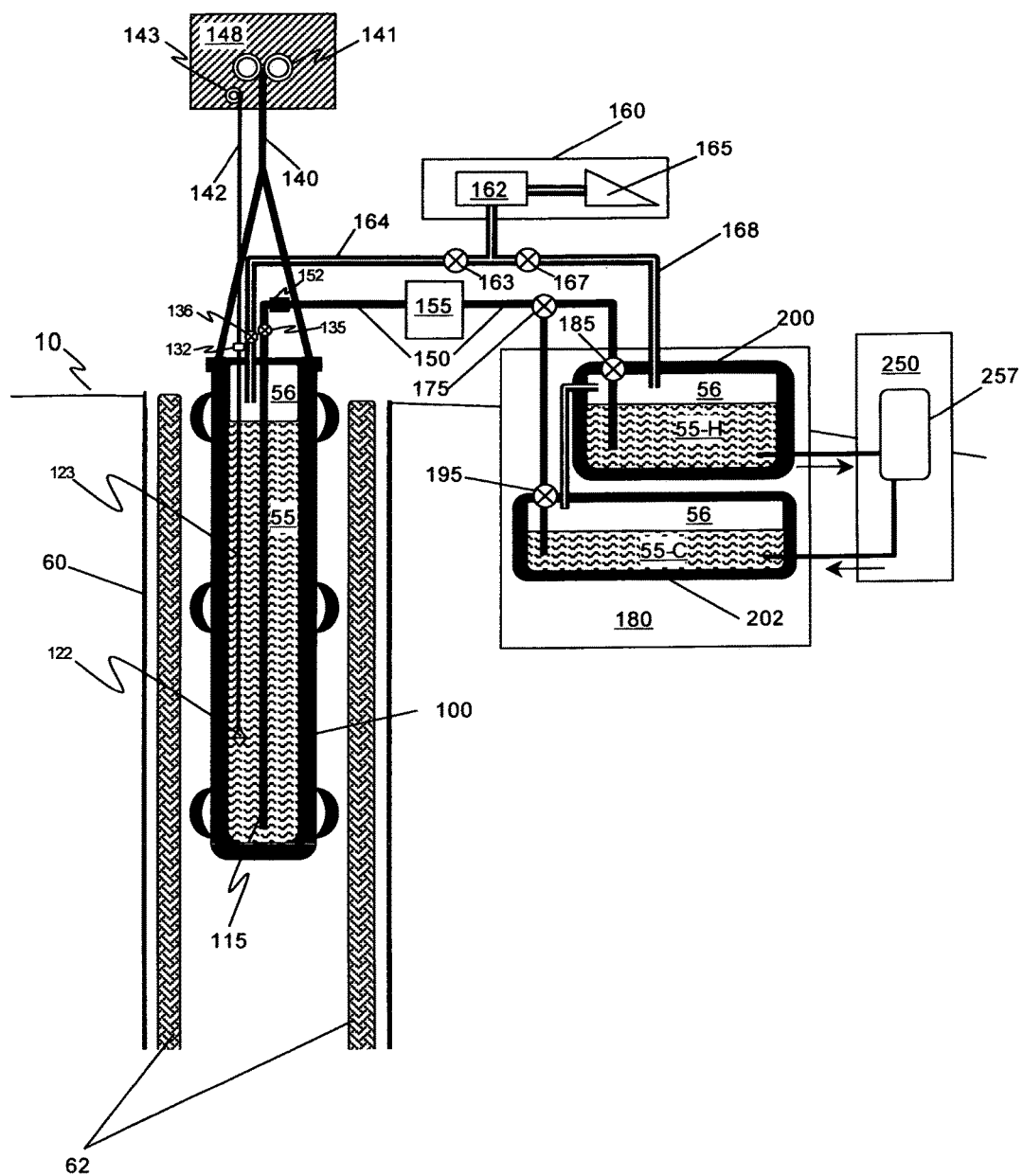
FIG. 7 presents a cross section view of an embodiment of the invention that uses a thermal fluid to transfer the heat from the thermal mass.

FIG. 7 provides a more detailed illustration of one embodiment of the invention. For this embodiment, the thermal mass 100 comprises a hollow cavity, typically cylindrical in shape, which is filled to a predetermined level with a thermal fluid 55. The fluid can be liquid water if used in a relatively cool well below 100° C.; or a molten salt or combination of salts, such as, for example, CN—K (Potassium Calcium Nitrate—$KNO_3 5Ca(NO_3)_2 10H_2O$) as offered by Yara International ASA of Norway for warmer wells, (e.g. 150° C. to 500° C.); or, for higher temperatures (e.g. 300° C. to 1000° C.) a molten salt mixture such as one comprising by weight 50% Potassium Nitrate ($KNO_3$), 40% Sodium Nitrite ($NaNO_2$) and 7% Sodium Nitrate ($NaNO_3$). Other mixtures of salts can be used, comprising salts such as sodium fluoride (NaF), sodium chloride (NaCl), potassium fluoride (KF), potassium chloride (KCl) (which melt at even higher temperatures) as long as their proportions are managed to provide an appropriate thermal and fluid properties for the temperature of the thermal pool 560. Mixtures of molten salts used for energy storage and transport in the concentrated solar power (CSP) facilities may also be adapted for use in the embodiments of the invention disclosed here.

During the preparation of the thermal mass 100, the hollow interior of the thermal mass 100 is provided with thermal fluid 55 from a cool thermal fluid reservoir 202 which will typically contain previously cooled fluid 55-C. This cool thermal fluid reservoir 202 will typically be constructed in the thermal reservoir containment 180, which also contains the thermal reservoir 200 for heated thermal fluid 55-H. The filling process for the thermal mass 100 can be controlled by a pumping system 155 through a valve on the cool thermal fluid reservoir 202 and a valve 185 that switches the pumping system 155 between the cool thermal fluid reservoir 202 and the thermal reservoir 200. The fluid 55 is provided to the thermal mass 100 through thermal transfer conduit 150 through the moving or telescoping junction 152 which connects to the thermal mass 100 at the thermal fluid connector 135. The thermal mass 100 in some embodiments will comprise an interior transfer tube 115 connected to the thermal fluid connector 135 that extends to near the bottom of the reservoir within thermal mass.

Since hot fluids, and in particular a molten salt system, can degrade rapidly when exposed to air, and additionally can be corrosive and dangerous, it may be advisable to seal the thermal fluid from exposure to the ambient environment. In that case, there can be an additional system to provide a cover gas 56 compatible with the thermal fluid 55 to allow fluid levels to vary without venting the system to outside air. Such a cover gas system would include a cover gas manager 160, comprising a cover gas reservoir 165 and a cover gas pumping system 162 to provide cover gas 56 to the thermal mass 100 through a valve 163 and piping 164, which connects to the thermal mass 100 at a cover gas connector 136, or to provide cover gas 56 to the thermal reservoir containment 180 through a valve 167 and piping 168.

The thermal mass 100 may also comprise sensors such as a temperature sensor 122 connected to an internal data cable 123 that connects at a data connector 132 to the communication cable 142. The selection of the exact materials used in the temperature sensor 122 may be different, depending on the selection of thermal fluid 55 and the temperature increases expected. In particular, any sensors that are used must be able to operate at the heightened temperatures expected to be found in the thermal pool 560, which may routinely exceed 500° C. and may in some embodiments be nearly as hot as molten magma. For lower temperature thermal pools 560, conventional thermocouples may be employed in the temperature sensor 122. For embodiments with high temperatures, many metals melt, and sensors comprising complex circuits can no longer function. For these situations, simpler systems such as a platinum resistance thermometer may be employed as the temperature sensor 122. For extremely hot temperatures, a dual metal (two component) thermostat may be employed, simply making electrical contact to close a circuit once a predetermined calibrated temperature has been reached. Other temperature sensor options may be known to those skilled in the art.

The thermal mass may also comprise other sensors, including but not restricted to motion sensors, accelerometers, acoustic sensors, optical sensors, infrared sensors, fluorescence sensors, pressure sensors, and sensors for temperature gradients. The connections for the various sensors can be through electrical wires to the communications cable 142, through a fiber optic connector, or through wireless transceivers. The only major consideration limiting selection among these various options is their ability to function under the temperature conditions found when the thermal mass 100 has been immersed in the thermal pool 560.

Once the thermal mass 100 has been heated in the thermal pool 560 and returned to the Heat Transfer Zone, the moving or telescoping junction 152 can be joined at the thermal fluid connector 135 to the internal transfer tube 115 within the thermal mass 100. The internal transfer tube 115 provides a means of evacuating the thermal fluid 55 from the thermal mass 100 through the thermal transfer conduit 150, which can also comprise a pumping system 155 to pump the thermal fluid 55 from the thermal mass 100 into the thermal reservoir 200. This pumping system 155 and conduit 150 can be the same pumping system and conduit previously used to fill the thermal mass, or in some embodiments separate pumping systems and conduits may be designed to provide an alternative flow channel. A valve 175 controls the flow of thermal fluid into the thermal reservoir through valve 185, which can be closed once the transfer has been completed. In some embodiments, the thermal transfer conduit 150 and components of the pumping system 155 as well as other components in contact with the thermal fluid may be coated with a suitable material such as Nichrome to prevent corrosion.

Once transferred to the thermal reservoir 200, the hot thermal fluid 55-H in the thermal reservoir 200 can then be used to generate electricity or drive another industrial process such as pyrolysis in a production facility 250, which can comprise a means for generating electricity 257 or some other production equipment. Once its heat has been extracted and used, the cooled thermal fluid 55-C can be returned to a cool thermal fluid reservoir 202, where it serves as a source of thermal fluid 55 for refilling the thermal mass 100.

Figure 8:
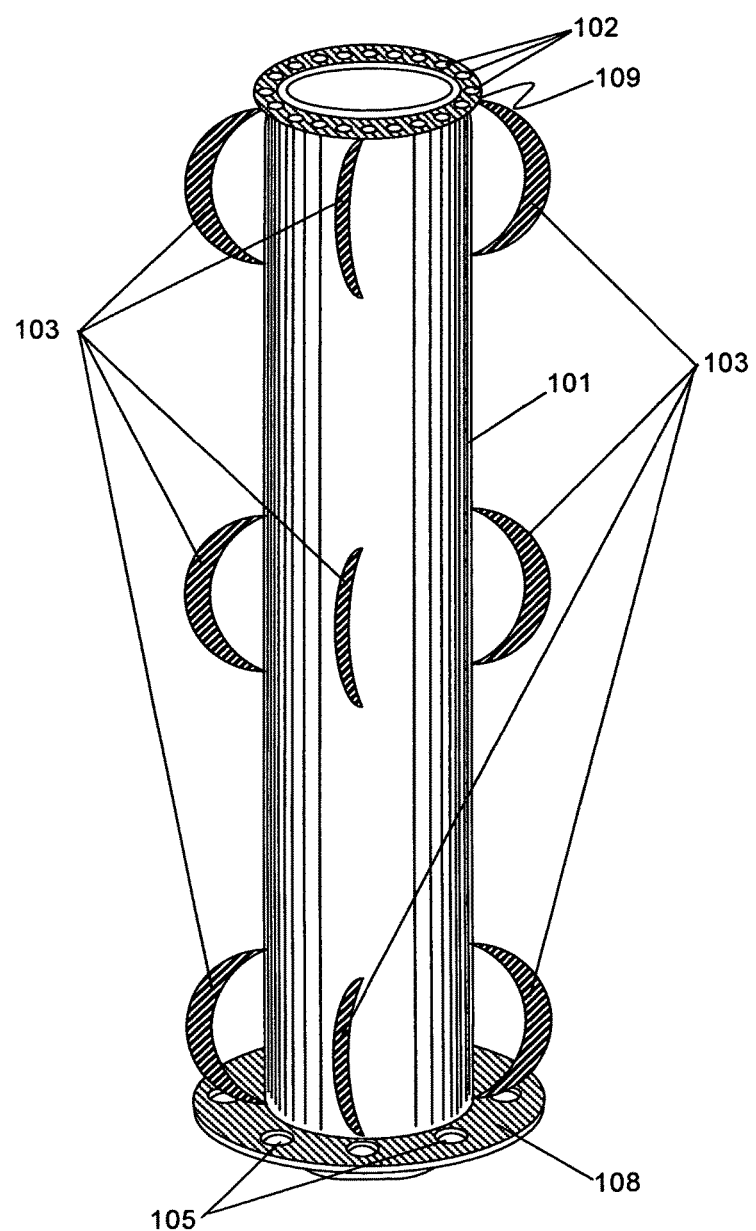
FIG. 8 presents an external shell for a thermal mass according to the invention.

FIG. 8 shows an example of one embodiment for the external parts of an assembly for a thermal mass 100. The exterior shell 101 in this example is a cylindrical tube, sealed at the bottom, and can be manufactured from a chromium alloy steel such as duplex SAE grade 2205 stainless steel if the thermal mass is to be used at temperatures lower than 300° C., while a corrosion resistant steel also containing molybdenum such as SAE grade 254SMO can be used for hotter temperatures. The thickness may vary depending on the overall weight and design considerations, but it is expected that a thickness of 1 cm (⅜") or larger for the wall thickness will be typical. The thermal mass 100 is also expected to typically be as large as 1 meter in diameter, and may be as long as 30 meters. The inner and/or outer surface of the exterior shell 101 can also be coated with an alloy such as nichrome to help prevent corrosion.

To facilitate centering in the well shaft 60, the outside of the cylindrical shell may be provided with several spacers 103 designed to be able to bump against the side of the well as the thermal mass 100 descends and ascends. The spacers 103 can be simple metallic structures acting as springs welded onto the side of the exterior shell 101, or can be more complex structures, comprising rollers or other mechanisms designed to reduce the friction with the wall of the well shaft 60.

The bottom of the exterior shell 101 can comprise structures 108 such as a ring or a flange that provide a means for supporting the bottom of the thermal mass 100 such as apertures 105 for attaching cables. These structures 108 may be welded to the exterior shell 101, held by means of a threaded grooves cut into the side of the exterior shell 101, or attached by some other means known to those skilled in the art. The top of the exterior shell 101 may comprise a shell flange 109 comprising a number of apertures 102 that can be used to seal the top of the thermal mass 100 using a sealing method such as a stainless steel O-ring, in which the shell flange 109 is bolted to a mating top flange through the apertures 102 in a manner that crushes the O-ring, making a seal. The only requirement is that this sealing method be able to withstand the temperatures and pressures that the thermal mass 100 will be subjected to in the thermal pool 560.

Figure 9:
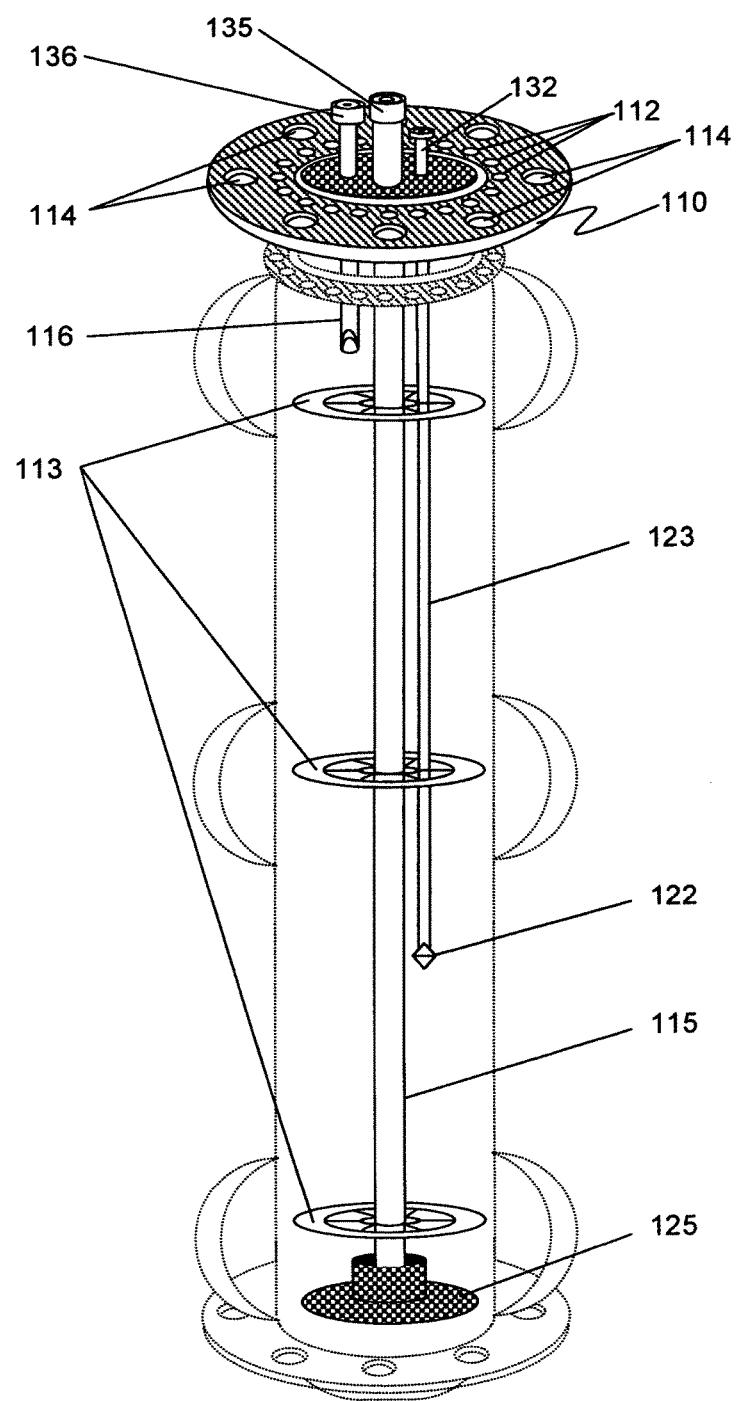
FIG. 9 presents the internal and top parts of a thermal mass according to a first embodiment of the invention.

FIG. 9 shows the complementary part of the thermal mass 100, comprising the top flange 110 and also several internal structures. The top flange 110 is designed to be mated to the shell flange 109 shown in FIG. 8, with apertures 112 in the top flange 110 aligned with the apertures 102 in the shell flange 109.

As shown in FIG. 9, the top flange 110 is larger in diameter than shell flange 109, and additionally comprises apertures 114 that provide a means of suspending the top of the thermal mass 100 from the suspension cable 140.

As shown in FIG. 9, the top flange 110 also comprises the various feedthroughs that connect the thermal mass 100 to various systems. The thermal fluid connector 135 is attached to the internal transfer tube 115 and is designed to mate with the moving or telescoping junction 152 to transfer the thermal fluid 55 into and out of the thermal mass 100. The cover gas connector 136 is attached to an internal cover gas tube 116 and is designed to mate with the piping 164 that provides cover gas 56 from the cover gas manager 160. The data connector 132 is attached to an internal data cable 123 that connects to internal sensors, such as a temperature sensor 122, and is designed to mate with the communication cable 142 that provides information about the thermal mass 100 to the control system 148.

As shown in FIG. 9, the internal structures can also comprise internal spacers 113 that hold the various internal elements such as the internal transfer tube 115 for thermal fluid and the internal data cable 123 in place. The internal structures can also comprise a shoe 125 at the bottom of the internal transfer tube 115 that adjusts the flow direction of the thermal fluid 55 as it enters and exits the thermal mass 100.

Figure 10:
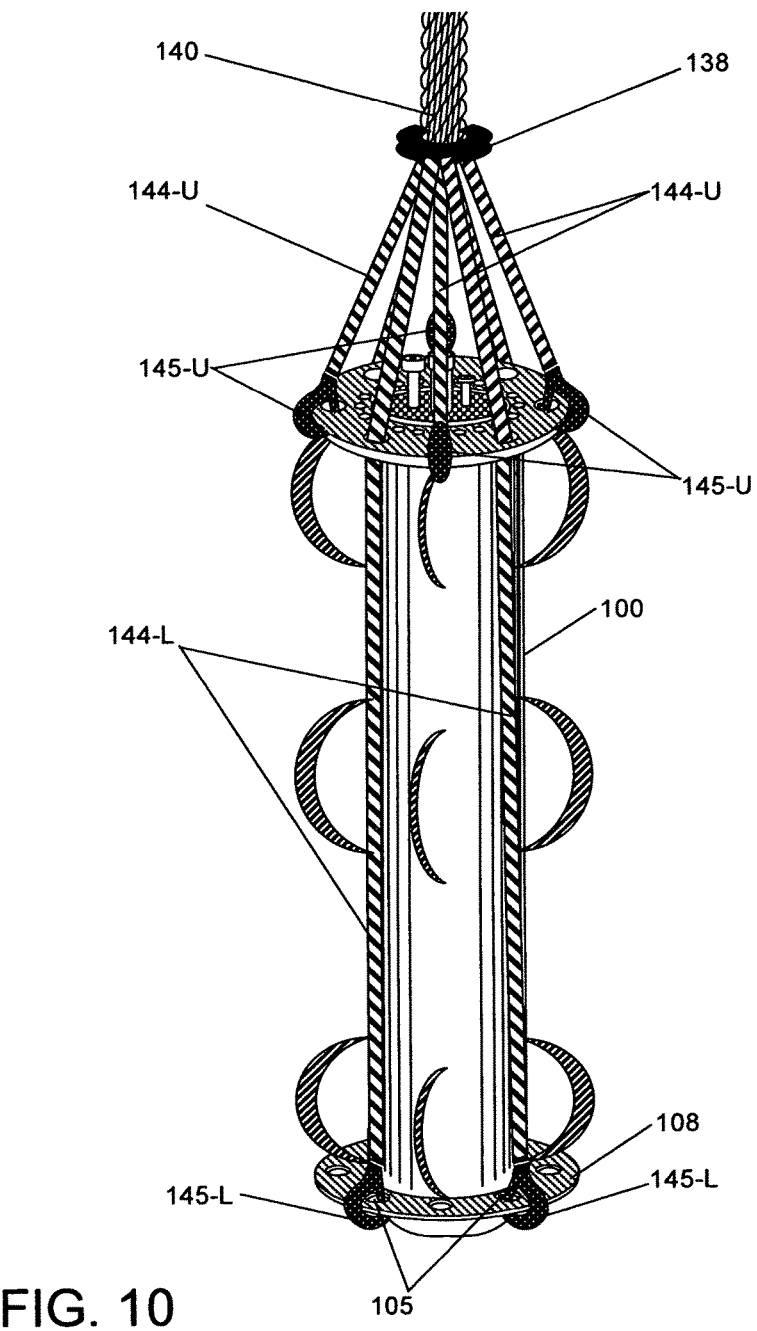
FIG. 10 presents a mechanism for mechanical support of the thermal mass according to the invention.

FIG. 10 shows one embodiment of the invention in which the assembled thermal mass 100 has been suspended from the suspension cable 140. In this illustration, the suspension cable 140 is split at the coupling mechanism 138 into eight smaller suspension cables 144, each with attachment mechanisms 145 such as hooks or fasteners. In the embodiment of FIG. 10, four of these cables 144-U are shorter, and attach to four of the apertures 114 in the top flange 110 using hooks 145-U. The other four cables 144-L are longer, and pass through the other apertures 114 in the top flange 110 and extend to the apertures 105 in the structures 108 attached to the lower portion of the thermal mass exterior shell 101 using hooks 145-L.

Although FIG. 10 presents one embodiment for suspending the thermal mass 100, it will be clear to those skilled in the art that several different suspension mechanisms can be devised which will still conform with the embodiments of the invention as described in this section. In one embodiment, a web of cables can support the thermal mass at a plurality of points. In one embodiment, the thermal mass can be contained in a net of cables that is suspended from the suspension cable 140. In one embodiment, the spacers 103 can be integrated into the suspension system to provide additional points of attachment for the smaller suspension cables 144 that merge to form the suspension cable 140. In other embodiments, the thermal mass itself may comprise steel rods or attachment mechanisms designed to mate with one or more attachment mechanisms, such as hooks, suspended from the suspension cable 140.

If will also be clear to those skilled in the art that the illustration in FIG. 10 is not necessarily to scale. The thermal mass can, for example, have a diameter as small as 1 cm or as large as 1 meter, as well as a length as small as 25 centimeters or as large as 30 meters or even larger, depending on the size and scale of the well and the lifting mechanism. It will also be clear to those skilled in the art that some embodiments of the invention may be engineered in which the thermal mass is more aerodynamically streamlined than illustrated in FIG. 10. A more streamlined design will reduce air drag on the thermal mass 100 as it is lowered into or hauled out of the well shaft 60, accelerating the energy transfer process.

It should also be noted that, although we have described this embodiment as using a cable as the mean of suspension, it will be known to those skilled in the art that ropes, chains, cords, wires, fabrics, fibers, nets, and other means of suspension can be used to support the thermal masses.

It should also be noted that steel cables, although strong and well established in the art, can be heavy and may not provide the optimal performance as suspension cables over time for wells in which the temperatures are high. New innovations in synthetic cables, such as cables manufactured from para-aramid fibers such as Twaron® or Technora® by the company Teijin Aramid (based in Arnhem, the Netherlands) are lightweight, and may serve better for wells with certain temperature profiles. Other synthetic cables, such as those manufactured by Cortland Cable of Cortland, N.Y., or high temperature cables for sensors from York Wire and Cable of York, Pa., may also be suitable for certain uses in the design and employment of thermal masses. In any case, for high temperature wells, some amount of cable insulation may be desired.

A Second Embodiment of the Invention

Figure 11:
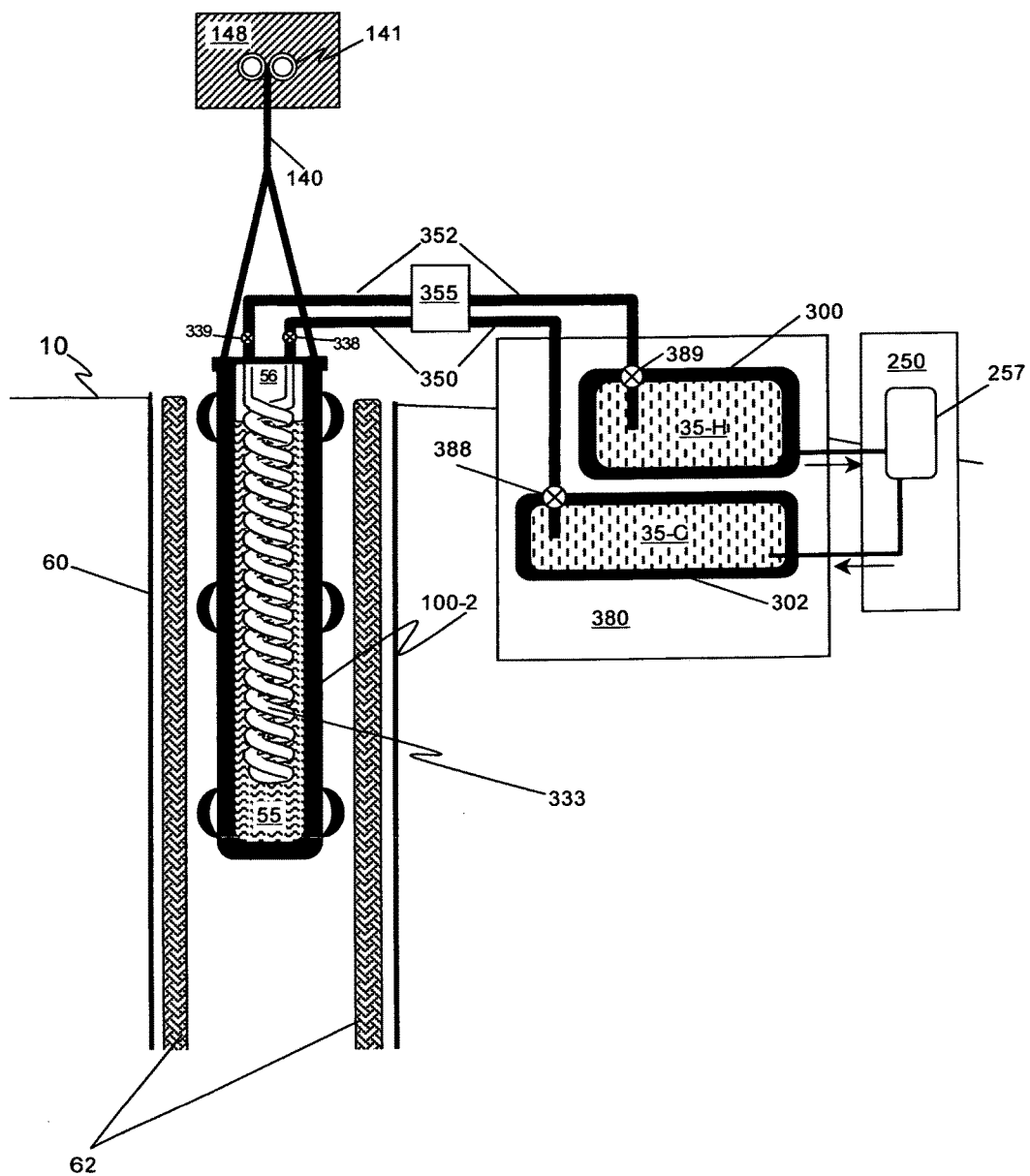
FIG. 11 presents a cross section view of an embodiment of the invention that uses a thermal exchange fluid to transfer the heat from the thermal mass.
Figure 12:
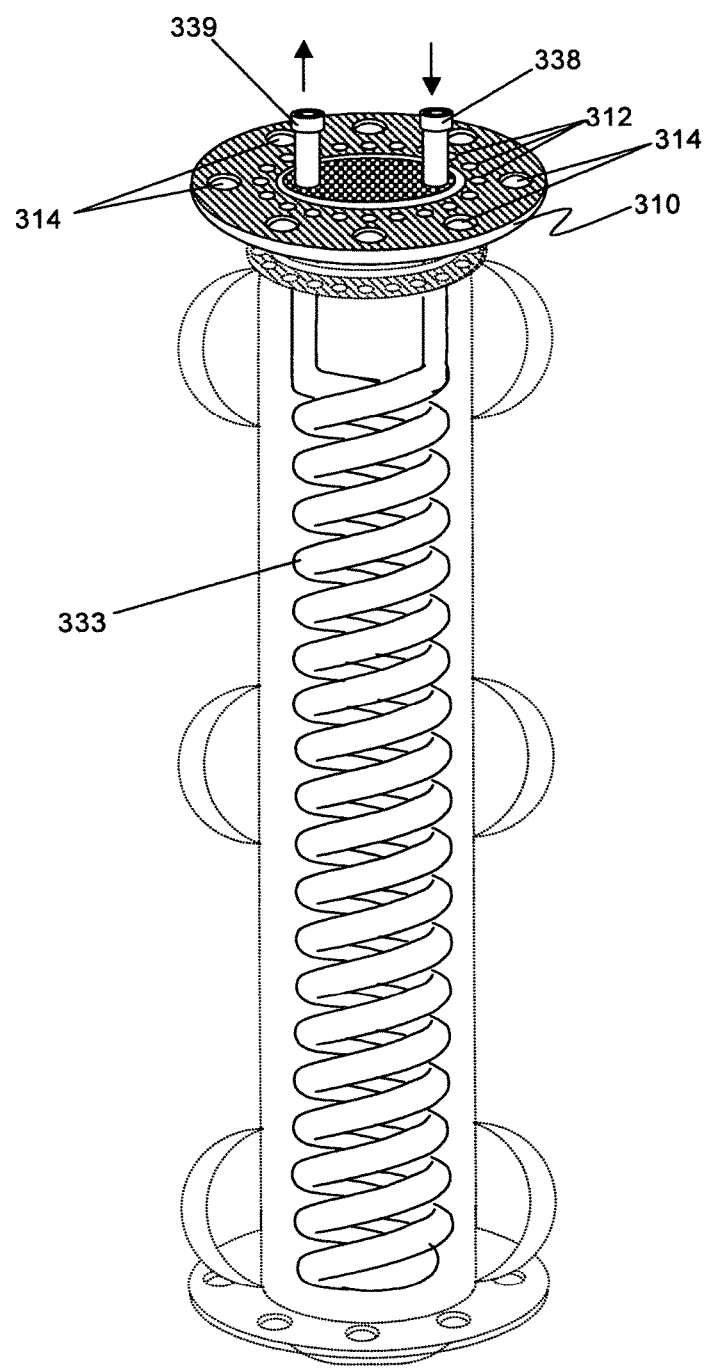
FIG. 12 presents the internal and top parts of a thermal mass according to a second embodiment of the invention.
Figure 13:
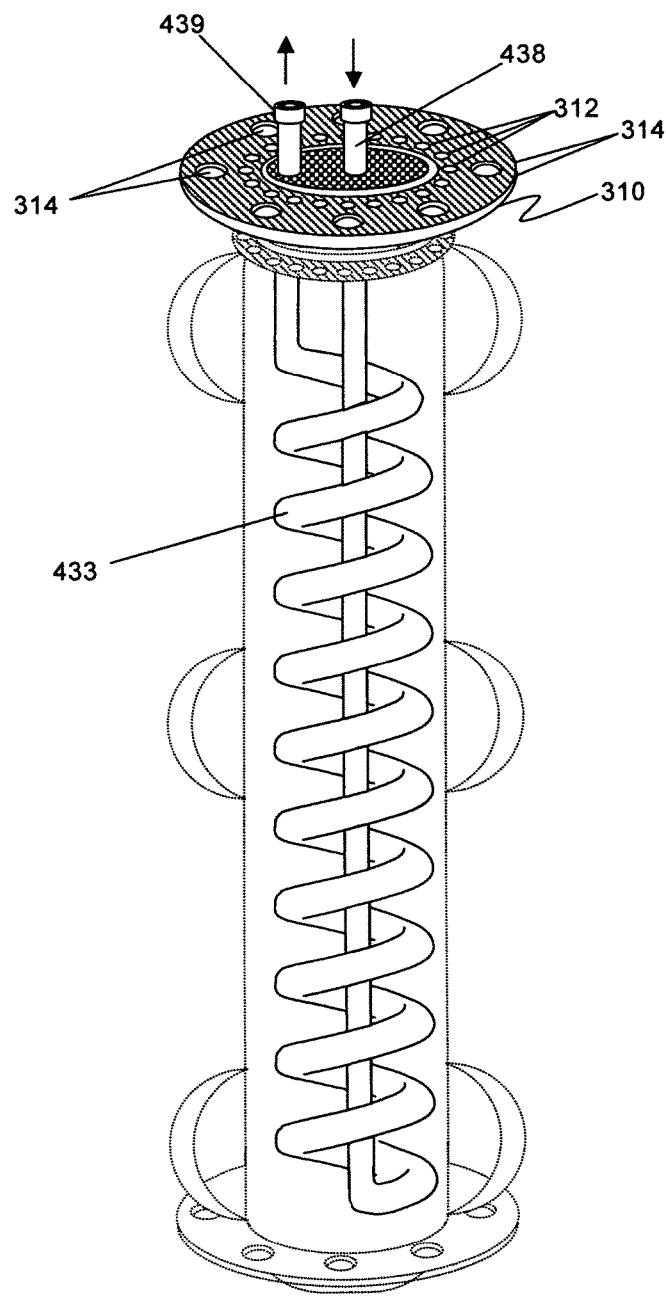
FIG. 13 presents the internal and top parts of a thermal mass according to a variation of the second embodiment of the invention.

FIG. 11, FIG. 12 and FIG. 13 show an alternative embodiment of the invention. In this embodiment, as in the first embodiment, a well shaft 60 can be dug to a thermal pool 560. As before, the well shaft 60 can be lined with various casings, such as an insulating casing 62 in the upper portions of the shaft and a thermal casing 64 in the lower portion of the shaft. As before, a thermal mass 100-2 is lowered on a suspension cable 140 to a Heat Absorption Zone, heated by the thermal pool 560. After heating, the thermal mass 100-2 is then raised to a Heat transfer Zone near the surface of the Earth 10, and the heat unloaded into a thermal reservoir 300 contained in a thermal reservoir containment 380. The thermal mass 100-2 again comprises a cylindrical exterior shell 101, which can be the same design as was illustrated for the previous embodiment in FIG. 8, and can also have an interior cavity containing a thermal fluid 55 covered with a cover gas 56.

However, in this embodiment, the thermal fluid 55 remains in the thermal mass 100-2, and the thermal mass 100-2 is designed with an internal channel comprising internal piping 333 designed to have a significant surface area in contact with the thermal fluid 55. The internal piping 333 facilitates the flow of a thermal transfer fluid 35 from a thermal reservoir containment 380 containing a thermal reservoir 300. The thermal transfer fluid absorbs heat as it flows through the internal piping 333 of the thermal mass 100-2. The thermal transfer fluid 35 can be a liquid, such as water, or one of many glycol-based fluids such as DOW-THERM™ (from Dow Chemical Company of Midland, Mich.), or be selected from a variety of proprietary fluids such as Duratherm S (offered for sale by Duratherm Extended Life Fluids of Lewiston, N.Y.) or Dynalene HT (offered for sale by Dynalene Inc. of Whitehall, Pa.); or be a molten salt mixture such as CN—K (Potassium Calcium Nitrate—$KNO_3 5Ca(NO_3)_2 10H_2O$) (offered for sale by Yara International ASA of Norway), or conventional molten salts comprising various mixtures of nitrates and nitrides used in the concentrated solar power (CSP) industry. The exchange fluid can also be a gas, such as nitrogen, argon, helium, or compressed carbon dioxide.

After the thermal mass 100-2 has been warmed in the thermal pool 560 and brought back to the surface, the internal piping 333 can be attached using intake junction 338 to the thermal transfer fluid input conduit 350 and outflow junction 339 to the outflow conduit 352. A pumping system 355 facilitates the transfer of the thermal transfer fluid 35 through the thermal mass 100-2 to the thermal reservoir 300 through export valve 389. The heated thermal transfer fluid 35-H in the thermal reservoir 300 can then be used to generate electricity or drive another industrial process such as pyrolysis in a production facility 250, which can comprise a means for generating electricity 257 or some other production equipment. Once its heat has been extracted and used, the cooled thermal transfer fluid 35-C can be returned to a cool thermal fluid reservoir 302, where it serves as a source of thermal fluid 35 for refilling the thermal mass 100-2.

FIG. 12 shows an example of one embodiment for the internal parts of an assembly for a thermal mass 100-2 designed to use a thermal transfer fluid 35. As in the previously described embodiment, a top flange 310 has been designed to mate with shell flange 109, and apertures 312 in top flange 310 are designed to correspond to the apertures 102 in shell flange 109 for sealing using a sealing method such as a stainless steel O-ring, as described in a previous embodiment.

However, in this embodiment, the top of the thermal mass 100-2 will comprise an intake junction 338 where thermal transfer fluid 35 enters the internal piping 333 of the thermal mass 100-2. The thermal transfer fluid heats up as it flows through the internal piping 333, which in this illustration is shown as a double helix structure. Heated thermal transfer fluid 35 then flows out of an outflow junction 339 where the thermal transfer fluid exits the internal piping 333 of thermal mass 100-2.

FIG. 13 shows an additional example of one embodiment for the internal parts of an assembly for a thermal mass 100-2 designed to use a thermal transfer fluid. As in the embodiment illustrated in FIG. 12, the thermal mass 100-2 comprises internal piping 433 to facilitate heat transfer, and comprises a top flange 310 that has been designed to mate with shell flange 109, and apertures 312 in the top flange 310 are designed to correspond to the apertures 102 in shell flange 109 for sealing using a sealing method such as a stainless steel O-ring, as described in a previous embodiment.

As in the embodiment of FIG. 12, thermal exchange fluid will be provided to the thermal mass 100-2 through an intake junction 438 where thermal transfer fluid enters the internal piping 433 of the thermal mass 100-2. The thermal transfer fluid heats up as it flows through the internal piping 433, but in this case the piping comprises a straight inflow pipe directly to the bottom of the thermal mass 100-2, and a helical return path to the top. The heated thermal transfer fluid 35 flows out through an outflow junction 439 where the thermal transfer fluid exits the internal piping 433 of thermal mass 100-2

Note that, although a temperature sensor can be used in this embodiment to monitor the thermal mass, it is not expected that a temperature sensor inside the thermal mass is necessary for these embodiments of the invention. Instead, the temperature of the thermal exchange fluid 35 can be monitored as the heat is transferred.

It should also be noted that one possible variation on this embodiment has no thermal fluid 55 filling the thermal mass. Instead, the thermal mass 100-3 is simply filled with a solid material having a large heat capacity, such as granite, iron or stainless steel surrounding the internal piping 333. The solid material can be a cast solid, such as cast iron, or an ensemble of solid objects such as granite sand or small ball bearings.

It should also be clear that, although internal channels comprising piping in the form of a helix or a double helix have been illustrated, other configurations are also possible. Channels normally used in heat exchangers, such as a serpentine form in which the piping forms a zigzag pattern, or a conventional spiral coil can also be used. Likewise, it should also be noted that the connections to the internal channel, although shown as separate connectors in FIG. 12 and FIG. 13, could be designed as a single connector that can accommodate both the insertion and the removal of the thermal exchange fluid.

In some embodiments of the invention, the thermal mass may additionally comprise a stirring mechanism, to move cooler fluid near the center of the thermal mass to the warmer outside of the thermal mass, and thereby increase the rate of heat transfer.

Figure 25:
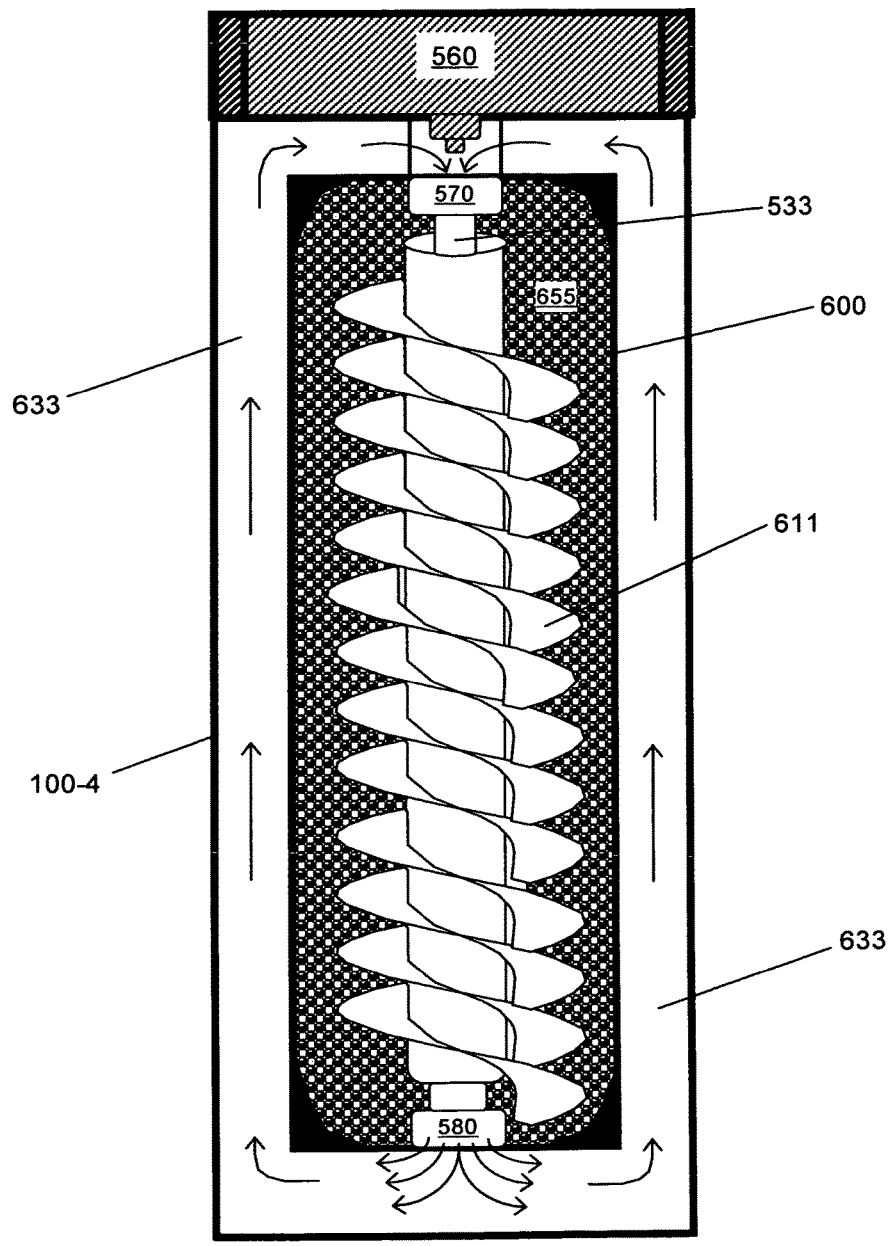
FIG. 25 presents a cross-section view of a thermal mass comprising two chambers according to one embodiment of the invention.

An additional embodiment of the invention is illustrated in the cross-section diagram of FIG. 25. In this embodiment, a thermal mass 100-4 is shown in which more than one chamber has been created. An inner chamber 600 is filled with a fluid 655 such as molten salt, and also comprises an internal stirring mechanism 611, such as a screw or other design which can move fluid from the inside of the chamber to the outside of the chamber. The internal stirring mechanism 611 may be stirred by a motor 560 attached to the thermal mass 100-4, or may be driven by cables attached to the thermal mass 100-4 that are connected to a driver higher in the well shaft, where temperatures are cooler.

The motor 560 may also be configured in such a way that it drives circulation of fluid in an outer chamber 633. In the embodiment as illustrated, fluid is driven through the shaft 533 running down the middle of the stirring mechanism 611, and diffuses out the bottom of the mechanism 611 and flows up through an outer chamber 633 that surrounds the outer portion of the thermal mass 100-4. The design of the embodiment may additionally comprise upper bearings 570 and lower bearings 580.

Variations on these embodiments may include designs in which fluid mixing between the inner chamber 600 and the outer chamber 633 is possible. Other embodiments of the invention may simply have inner and outer chambers with a circulating system that moves fluid between the inner shaft 533 and the outer chamber 633, but does not comprise a stirring mechanism.

In some embodiments, the fluids in the inner chamber 600 and the outer chamber 633 may be the same fluid. In some embodiments, these fluids will both be molten salt. In some embodiments, these fluids may be water or steam. In some embodiments, the fluids in the inner chamber 600 and the outer chamber 633 may be different fluids. In some embodiments, these fluids will be molten salts of different compositions. In some embodiments, the fluids may be gasses. In some embodiments, one or both of the fluids may be carbon dioxide.

A Third Embodiment of the Invention

In the previously described embodiments, the thermal mass can be lowered into the thermal well and then raised once it has acquired heat. However, for a single thermal mass raised into a single thermal well, significant energy must be expended to raise the thermal mass against the pull of gravity. This may place a practical limit on the mass that can be used, since a thermal mass that is heavier will require more energy to raise, especially when the wells are at depths of kilometers. However, heavier masses may be advantageous from a thermal energy point of view, in that heavier, denser thermal masses can have a significantly larger heat capacity, and therefore acquire more heat to be harvested once the thermal mass is returned to the surface.

An alternative embodiment of the invention can mitigate the energy expenditure required to raise warmed thermal masses from the thermal well. In this embodiment, at least two (2) paired thermal masses are connected by a single suspension cable, and serve as counter-weights for each other. Therefore, as one thermal mass is pulled down by gravity, it pulls its companion thermal mass up out of its thermal well.

Such counter-weight systems are commonly applied to the raising and lowering of construction materials for cranes, in the design of bridges, and the like. If the two thermal masses and cables are well matched, the only energy that need be lost to raise a thermal mass from a thermal wells is the energy to overcome the friction of the cables against their mechanisms, and the air resistance as the thermal masses are raised and lowered. Proper lubrication can reduce the energy losses due to friction, while aerodynamic design of the thermal masses can help reduce the drag encountered when the thermal mass is raised and lowered in the well shaft.

Figure 14:
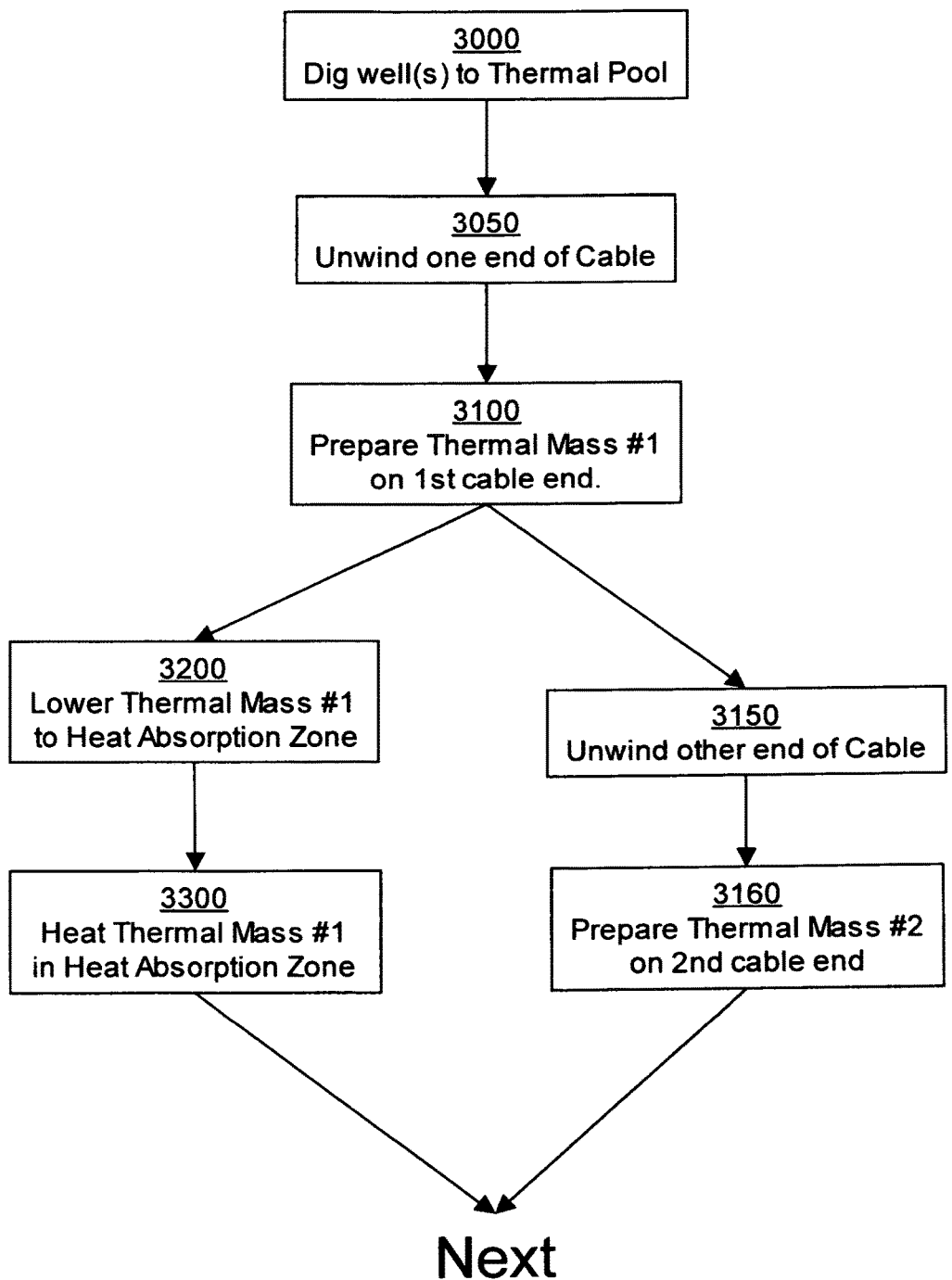
FIG. 14 presents a flow diagram of the first part of a process according to an embodiment of the invention in which two thermal masses are used.
Figure 15:
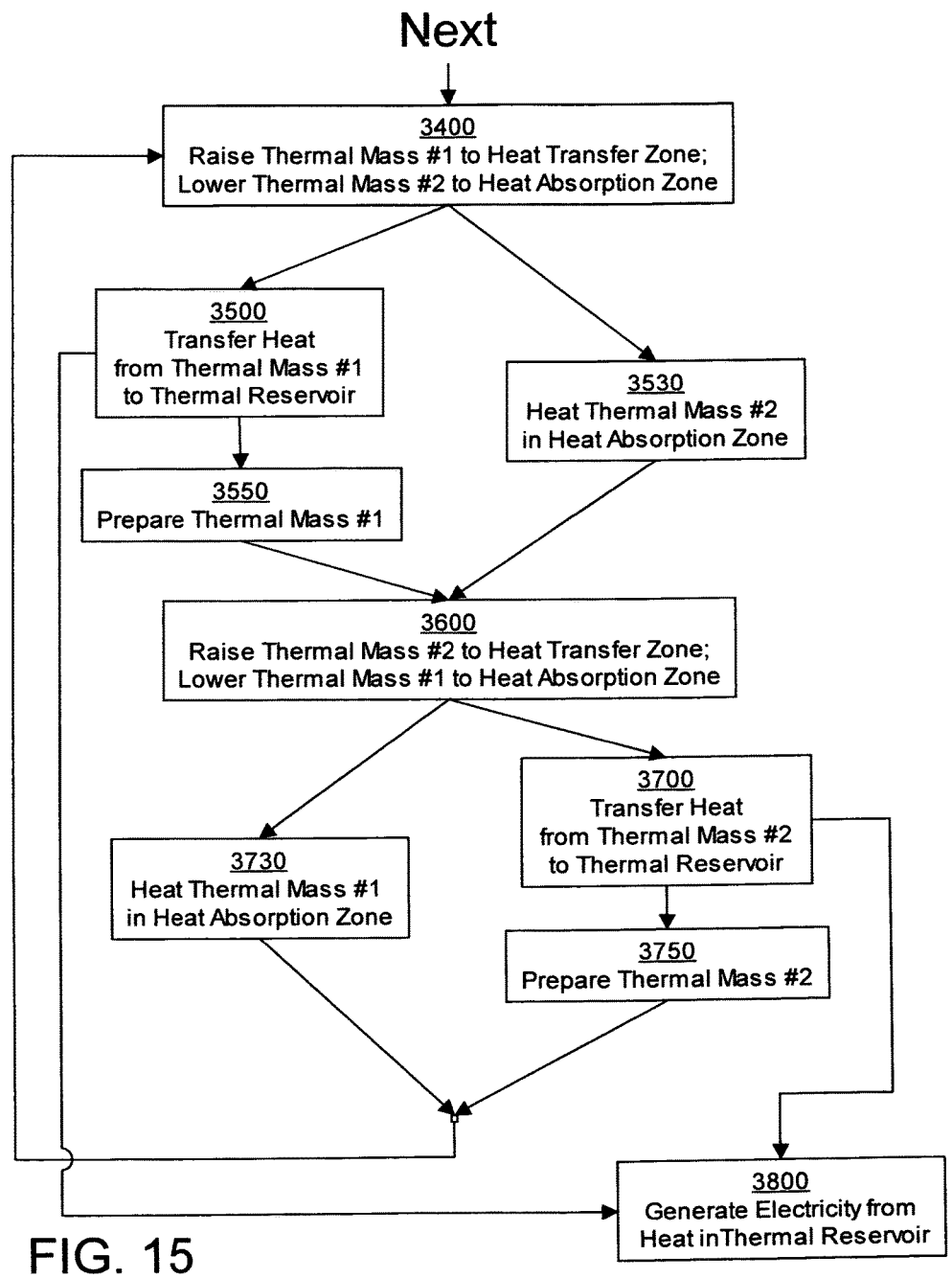
FIG. 15 presents a flow diagram of the second part of a process according to an embodiment of the invention in which two thermal masses are used.
Figure 16:
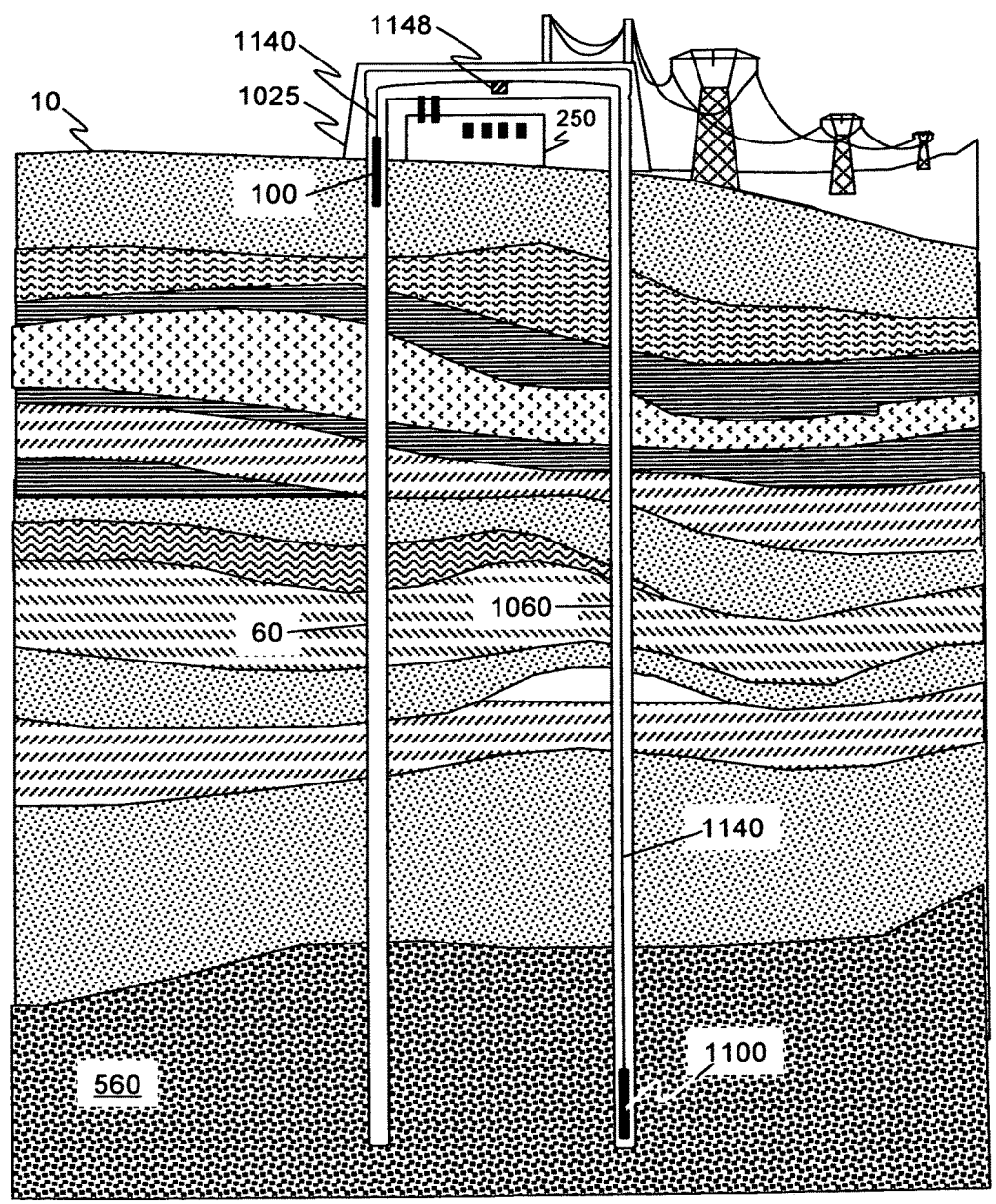
FIG. 16 presents a schematic overview of an embodiment of the invention in which two thermal masses are used.

The steps for this embodiment of the invention are illustrated in the flow diagrams of FIG. 14 and FIG. 15 and the overview cross-section diagram shown in FIG. 16. Note that the illustrations shown here are not to scale. The wells are anticipated to be kilometers deep, while the thermal masses are expected to be, for example, 50 centimeters to 30 meters long and perhaps 10 centimeters to 1 meter in diameter.

To start, as shown in FIG. 13, the initial step 3000 comprises digging well shafts 60 and 1060 into the Earth, until a portion of each well shaft 60 and 1060 is surrounded by a thermal pool 560, forming respective first and second Heat Absorption Zones. In the next step 3050, one end of the suspension cable 1140 is unwound, and in the third step 3100, a thermal mass 100 is then prepared with a procedure that typically comprises attaching it to one end of the suspension cable 1140, which in turn is attached to a control system 1148 for raising and lowering the thermal mass 100.

Once the thermal mass 100 has been prepared, in the next step 3200 the thermal mass 100 is then lowered down the well shaft 60 until it reaches the first Heat Absorption Zone heated by the thermal pool 560. After that, the next step 3300 comprises allowing the thermal mass 100 to remain surrounded in the first Heat Absorption Zone until a desired temperature is reached or a predetermined amount of heat has been transferred to the thermal mass 100.

In the meantime, near the surface of the Earth 10, a parallel step 3150 comprising unwinding the other end of the suspension cable 1140 occurs, and the second thermal mass 1100 is then prepared with a procedure step 3160 that typically comprises attaching it to the suspension cable 1140 which in turn is attached to the control system 1148 for raising and lowering the second thermal mass 1100.

After this, the next step 3400 as shown in continuation flow chart of FIG. 15 comprises raising the heated thermal mass 100 to the first Heat Transfer Zone near the surface of the Earth 10 while simultaneously lowering the second thermal mass 1100 into the second Heat Absorption Zone of a second well shaft 1060. By having the two thermal masses counterbalancing each other, the energy supplied by gravity to lower the second thermal mass 1100 pulls the first thermal mass 100 up the first well shaft 60, and therefore the only energy that need be supplied to drive the process is the energy to overcome friction and aerodynamic resistance of the thermal masses 100 and 1100 in their respective well shafts 60 and 1060.

The next step 3530 comprises allowing the thermal mass 1100 to remain in the second Heat Absorption Zone heated by the thermal pool 560 until a desired temperature is reached or a predetermined amount of heat has been absorbed by the thermal mass 100. In the meantime, in the first Heat Transfer Zone near the surface of the Earth 10, an alternative step 3500 executed in parallel comprises extracting the heat energy from the thermal mass 100 and transferring it to a thermal reservoir 200-2. Once the heat has been transferred from the thermal mass 100, the thermal mass 100 can be prepared according to the next alternative step 3550 for re-insertion into the well shaft 60.

After this, the next step 3600 comprises raising the heated second thermal mass 1100 to the second Heat Transfer Zone near the surface of the Earth 10 while at the same time lowering the first thermal mass 100 to the first Heat Absorption Zone of its well shaft 60. By having the two thermal masses counterbalancing each other, the energy supplied by gravity to pull the first thermal mass 100 down pulls the second thermal mass 1100 up the second well shaft 1060, and therefore the only energy that need be supplied to drive the process is the energy to overcome friction and aerodynamic resistance of the thermal masses 1100 and 100 in their respective well shafts 1060 and 60.

The next step 3730 comprises allowing the first thermal mass 100 to remain in the first Heat Absorption Zone heated by the thermal pool 560 until a desired temperature is reached or a predetermined amount of heat has been transferred to the thermal mass 100. In the meantime, in the second Heat Transfer Zone near the surface of the Earth 10, a parallel step 3700 comprises extracting the heat energy from the second thermal mass 1100 and transferring it to a thermal reservoir 200-2. Once the heat has been transferred from the thermal mass 100, the second thermal mass 1100 can be prepared again according to the next alternative step 3750 for re-insertion into the well shaft 60. Then, in a repetition of the previous step 3400, the heated thermal mass 100 is raised to the first Heat Transfer Zone while the second thermal mass 1100 is simultaneously lowered into the second Heat Absorption Zone of the second well shaft 1060, and with the subsequent repetition of the following steps 3500 through 3750, the cycle continues.

In the meantime, according to an alternative step 3800, the heat energy so transferred into the thermal reservoir 200-2 can be used for a number of useful processes, such as generating electricity, driving another industrial process such as pyrolysis, or simply being stored for later use in a production facility 250. A housing 1025 or other structure to protect the well shafts 60 and 1060 from the elements can also be constructed, either independent of, or in connection with the production facility 250.

FIG. 16 shows an overview schematic of a counterbalance system according to the invention. As before, a well shaft 60 has been drilled from the surface of the Earth 10 into the Earth so that a portion of the well shaft 60 is surrounded by a thermal pool 560, creating a Heat Absorption Zone. As before, the well shaft 60 can be lined with various casings, such as an insulating casing 62 in the upper portions of the shaft and a thermal casing 64 in the lower portion of the shaft. As before, a thermal mass 100, such as one described in the previous embodiments, is raised and lowered into the well shaft 60 on a suspension cable 1140. Heat can be transferred by one of the mechanisms described in the previous embodiments, such as complete detachment of the thermal mass 100, the transfer of a heated thermal fluid 55, or through the use of a thermal exchange fluid 35.

However, in this case, the suspension cable 1140 is also attached to a second thermal mass 1100 which is raised and lowered into a second well shaft 1060 that also has a portion of the well shaft 1060 surrounded by the thermal pool 560. This well shaft 1060 can also be lined with various casings, such as an insulating casing 62 in the upper portions of the shaft and a thermal casing 64 in the lower portion of the shaft. Typically, this second thermal mass 1100 would be of a matched type and design to the thermal mass 100, although variations may be desirable if some properties of the second well shaft 1060 differ from those of the initial thermal well shaft 60. A control system 1148 is used to control the mutual raising and lowering of the thermal masses in their respective well shafts 60 and 1060.

As in the previous embodiments, the thermal energy brought up with the initial thermal mass 100 or the second thermal mass 1100 can be used to generate electricity or drive another industrial process such as pyrolysis in a production facility 250. A housing 1025 or other structure to protect the well shafts 60 and 1060 from the elements can also be constructed, either independent of, or in connection with the production facility 250.

Figure 17:
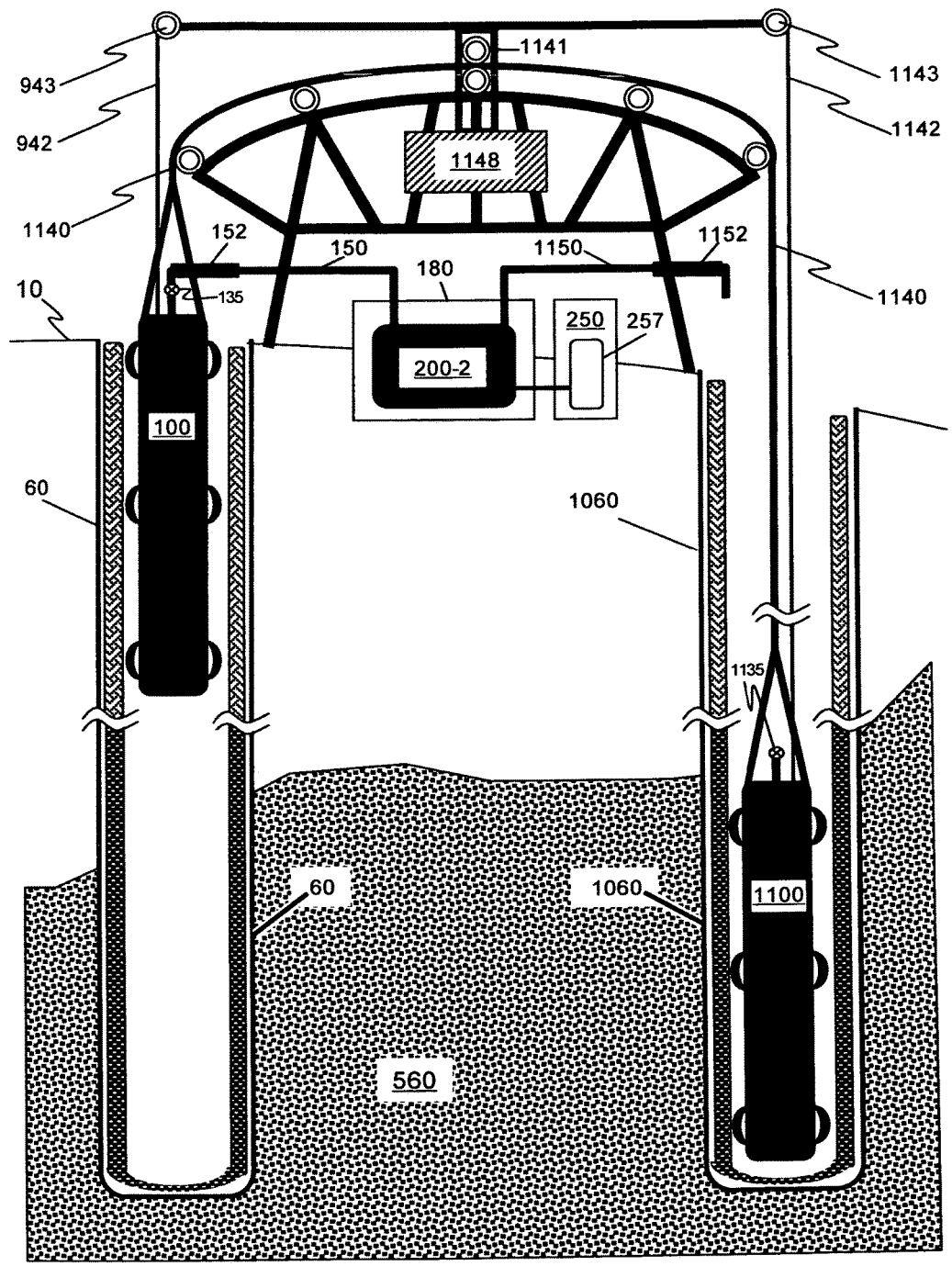
FIG. 17 presents in more detail a cross section view of the embodiment of the invention shown in FIG. 16 in which two thermal masses are used.

FIG. 17 shows a schematic of a counterbalance system according to the invention in more detail. Note that the illustration is not to scale, since the wells are anticipated to be kilometers deep while the thermal masses are expected to be 50 centimeters to 30 meters long.

In FIG. 17, as in the embodiment of FIG. 6, the thermal mass 100 has been raised to the surface and connected to the thermal reservoir 200-2 contained in a thermal reservoir containment 180 through the thermal transfer conduit 150 with a moving or telescoping junction 152 that connects using the thermal fluid connector 135. The suspension cable 1140 raises and lowers the thermal mass 100 and correspondingly lowers and raises the second thermal mass 1100, driven by a suspension mechanism 1141 that is controlled by a control system 1148.

As illustrated in FIG. 17, the second thermal mass will also require a means to unload its heat to the thermal reservoir 200-2, and in this illustration this is provided with a second thermal transfer conduit 1150 with a second telescoping junction 1152 that connects using the connector 1135 which is attached to the second thermal mass 1100 when it in turn has been raised near the surface of the Earth.

As in the previously described embodiments, it may be desired to have various sensors within the thermal masses. To facilitate the communication of data from these sensors on properties such as temperature, acceleration, distribution of mass, etc., a communication cable 942 driven by an independent mechanism 943 for the first thermal mass 100 and another communication cable 1142 driven by another independent mechanism 1143 for the second thermal mass 1100 may be used. These cables can be independently driven, or driven in concert by the control system 1148 that also controls the raising and lowering of the thermal masses 100 and 1100.

Figure 18:
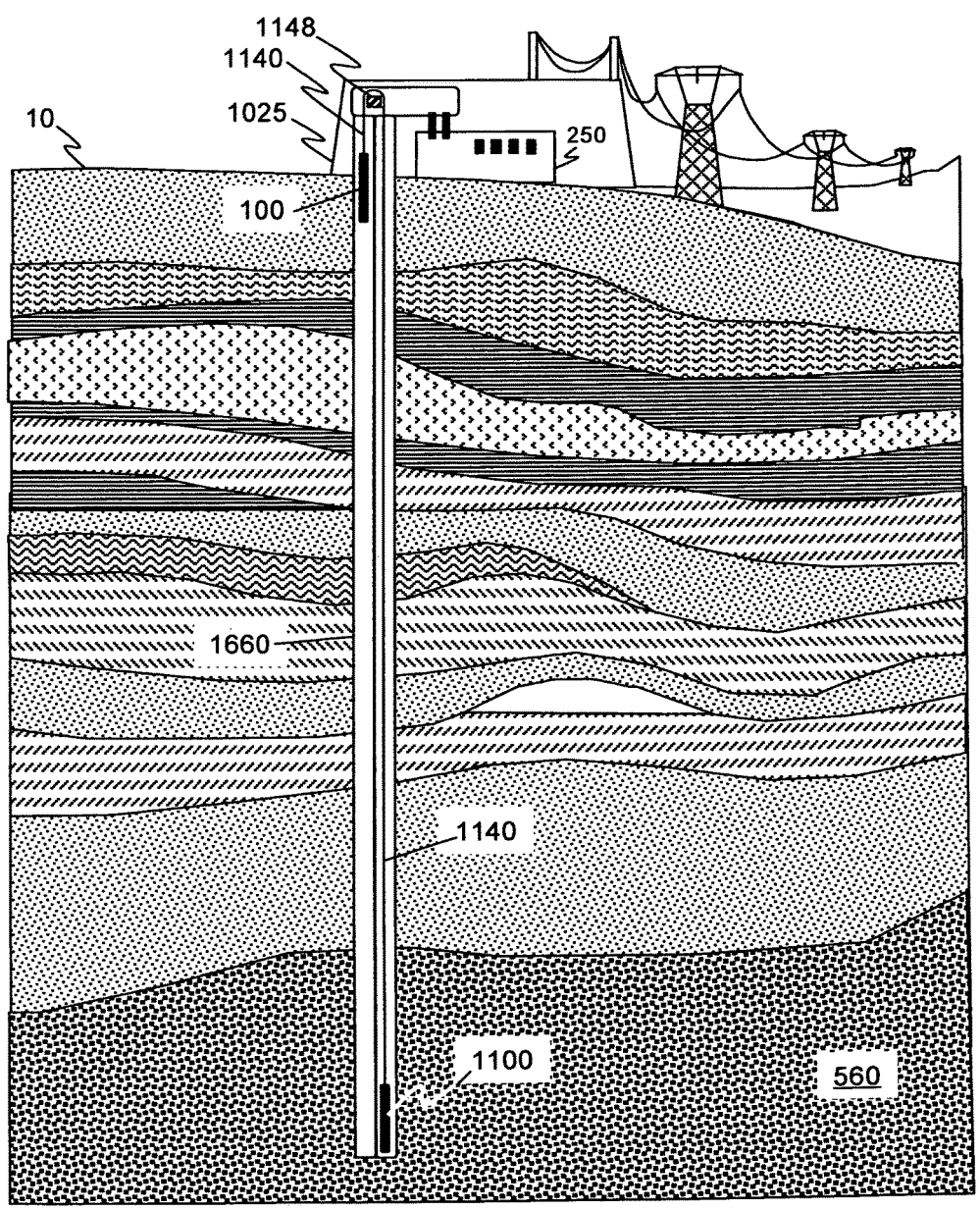
FIG. 18 presents a schematic overview of an embodiment of the invention in which two thermal masses are used in the same well.

FIG. 18 illustrates a variation of this embodiment of the invention, in which a counterbalance system comprising two thermal masses is used, but only one well shaft 2060 need be drilled. As in the previous embodiments, the well shaft 2060 can be lined with various casings, such as an insulating casing 62 in the upper portions of the shaft and a thermal casing 64 in the lower portion of the shaft. As before, there is an initial thermal mass 100 and a second thermal mass 1100, both attached to alternate ends of a suspension cable 1140. One thermal mass is raised from the thermal pool 560 while the other is lowered into the thermal pool 560, and the energy of gravity used to pull one weight down in turn is used to pull the other weight up. However, in this variation, a single well shaft 2060 has been dug, and the initial thermal mass 100 and the second thermal mass 1100 go up and down on different sides of a single well shaft 2060. This can reduce costs, as only one shaft need be prepared, but may add complexity to the structures within the shaft.

It should be noted that, although we have described this embodiment as using one cable as the means of suspension, it will be known to those skilled in the art that ropes, chains, cords, wires, fibers, fabrics, nets, and other means of mutual suspension can be used to support the two counterbalanced thermal masses.

It should be noted that counterbalance systems as described here might also be used with thermal masses designed to be filled with a material that undergoes a phase change, such as water that converts to steam. A thermal mass filled with water can descend into the thermal well (being used to generate electricity as it descends as well, as described in more detail below), and, once in the Heat Absorption Zone, the water will convert to steam. If a vent is provided to release the steam and allow it to rise to the surface, the thermal mass, now empty, will be much lighter, and the energy to raise the empty thermal mass will be significantly less than the energy needed to raise it when full. In the meantime, the heat from the steam may be harvested by various mechanisms at the surface.

A counterbalance mechanism with thermal masses filled with seawater may have the additional benefit of allowing seawater desalinization through geothermal energy. The steam released will leave the salt behind as residue in the thermal mass, which can be periodically cleaned to remove the accumulated salt. Because a full thermal mass will be much heavier than an empty thermal mass, the excess energy that may be produced by a descent into the well may be harvested by generating electricity, as is described in more detail below.

Additional Variations of the Invention

Although certain detailed embodiments have been described in this disclosure and illustrated in these drawings, it will be clear that some of the elements of other technologies, such as EGS, can also be combined with the embodiments described here. For example, the material for thermal casing 64 for the portion of the thermal well immersed in the thermal pool can be constructed from a material such as the grout used in the SWEGS prior art system.

Likewise, in some embodiments of the invention, more complex physical structures can be created in the Heat Absorption Zone, such as a network of drilled passageways to facilitate thermal migration. Also, a fluid, such as a glycol based fluid or a molten salt, can also be placed in the bottom of the thermal well, so that the thermal mass is completely or partially immersed in a bath of hot liquid when in the Heat Absorption Zone. The detailed designs of these structures created in the Heat Absorption Zone will, however, vary depending on the details of the geological strata and local thermal properties in the thermal well.

Although the descriptions presented here typically describe the use of a single thermal mass on a given suspension cable, another embodiment of the invention can have multiple thermal masses on a suspension system or track. Also, although the well shafts in this disclosure have typically been illustrated as vertical shafts into the ground, alternative, angled well shafts could also be employed, especially if a track were to be inserted into the well shaft to allow a "train" of thermal masses to be inserted into a Heat Absorption Zone. Such a thermal "train" may at first seem awkward because of its additional weight, but if an embodiment of the invention using a pair of "trains" arranged using two shafts in a counterbalance arrangement were employed, the energy acquired by one "train" as it was pulled into the Earth by gravity would balance the energy needed to pull the second "train" out of its respective well shaft, with the only significant losses due to friction of the "train" with its track and the friction of the moving cables, and the drag caused by the rush of the wind flowing past the thermal "train".

It should also be noted that steel cables, although strong and well established in the art, can be heavy and may not provide the optimal performance as suspension cables over time for wells in which the temperatures are high. New innovations in synthetic cables, such as cables manufactured from para-aramid fibers such as Twaron® or Technora® by the company Teijin Aramid (based in Arnhem, the Netherlands) are lightweight, and may serve better for wells with certain temperature profiles. Other synthetic cables, such as those manufactured by Cortland Cable of Cortland, N.Y., or high temperature cables for sensors from York Wire and Cable of York, Pa., may also be suitable for certain uses in the design and employment of thermal masses. In any case, for high temperature wells, some amount of cable insulation may be desired.

A Molten Salt Closed-Loop Embodiment of the Invention

In the previously described embodiments, a thermal fluid such as molten salt is placed in cavity within a thermal mass. The heat is acquired in a Heat Absorption Zone, and then transferred to a thermal reservoir in the Heat Transfer Zone.

Variations of another embodiment of the invention using a thermal material such as molten salt without bundling the thermal material in a thermal mass are illustrated in FIG. 19 through FIG. 24. In these embodiments, the thermal material does not need to be liquid at the beginning of the cycle, and can, in some embodiments, be a solid, such as ground or powdered solid salt at room temperature.

Figure 19:
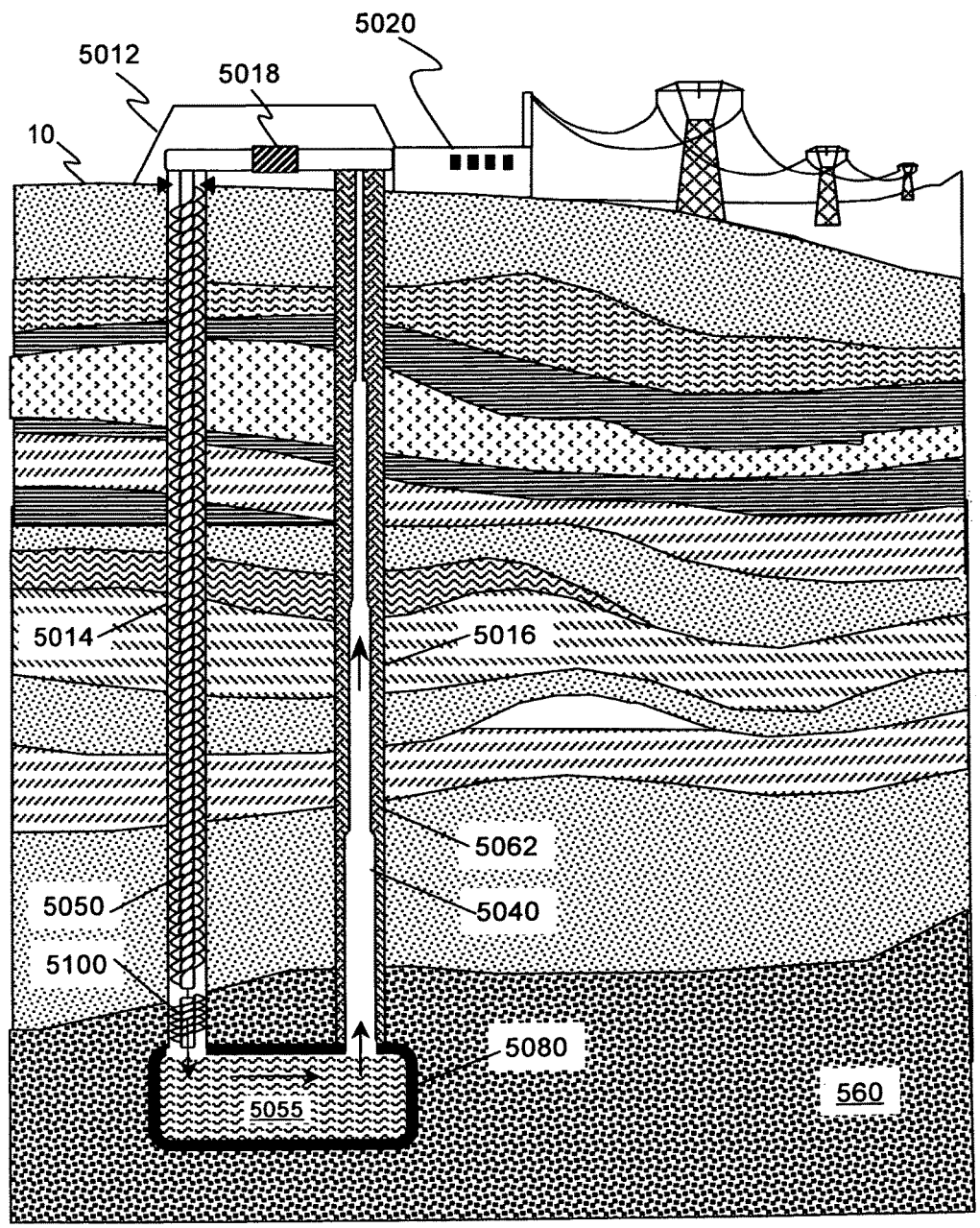
FIG. 19 presents a schematic overview of an embodiment of the invention using a closed loop for a thermal substance and comprising a screw conveyer along the length of the injection well.
Figure 20:
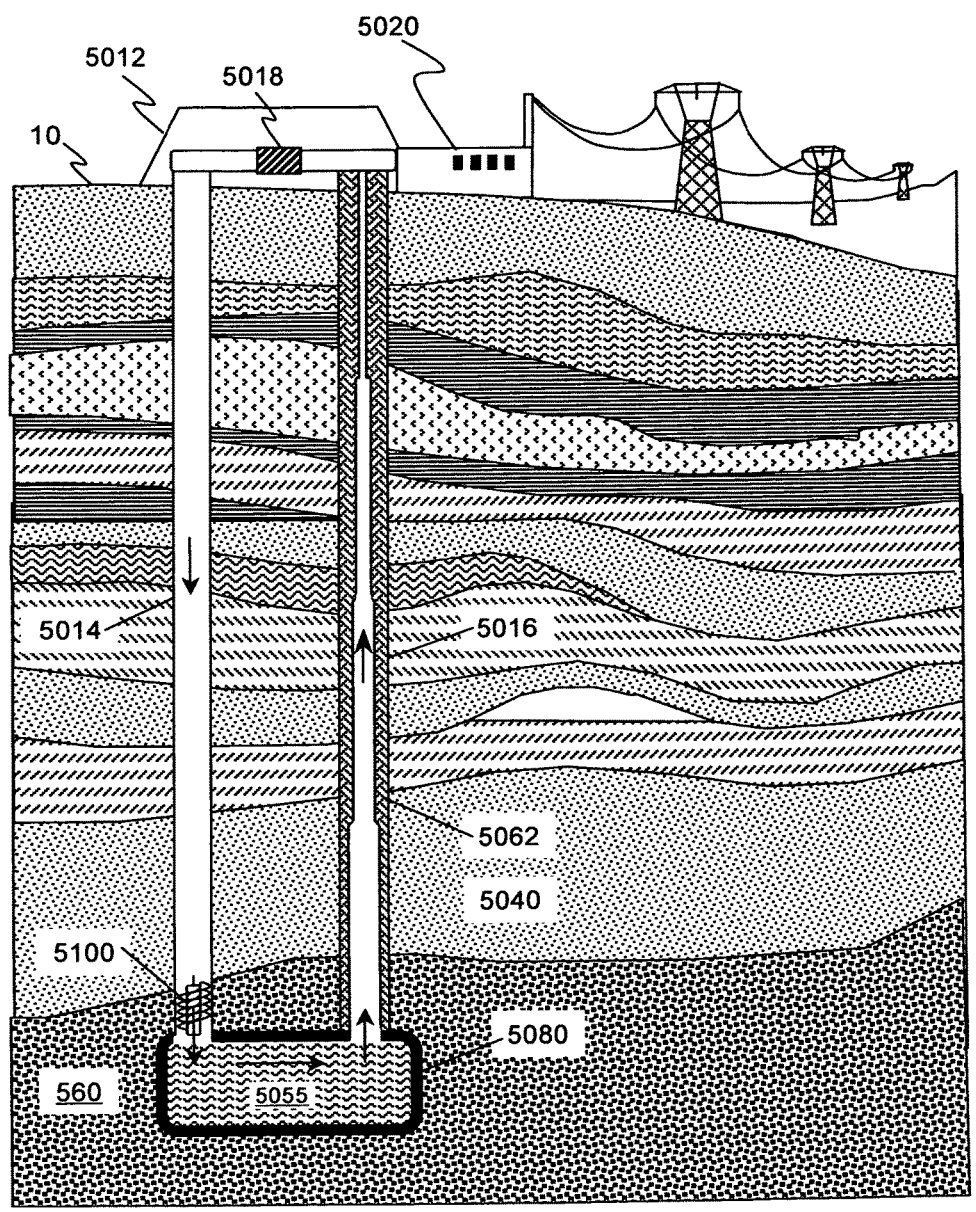
FIG. 20 presents a schematic overview of an embodiment of the invention using a closed loop for a thermal substance and comprising a ram screw in the Heat Absorption Zone.

As illustrated in FIG. 19, in a facility 5012 built at or near the surface of the Earth 10, a circulating system 5018 (which may comprise a grinder or chopper to pulverize large chunks of the solid thermal material) directs thermal material into a first well shaft 5014, which can comprise a driving apparatus such as a screw 5050, as illustrated in FIG. 19, or a pneumatic conveyor system installed in all or part of the well shaft 5014 as illustrated in FIGS. 21 through 24, or, as illustrated in FIG. 20, can simply be empty.

This driving apparatus can fill the well shaft 5014, as illustrated in FIG. 19, or be in several stages at various depths.

Referring again to FIGS. 19 and 20, in a facility 5012 built at or near the surface of the Earth 10, a circulating system 5018 directs thermal material into a first well shaft 5014. However, in the embodiment of FIG. 19, the well shaft 5014 has been fitted along its entire length with screw conveyer system 5050. Such systems, such as those manufactured by Screw Conveyer Corporation of Hammond, Ind., or KWS Manufacturing Company Ltd. of Burleson, Tex., are widely used in mining and other applications requiring material transportation, and it is expected that the specifications for such commercially available turn-key systems would be adequate for use in this embodiment of the invention.

Although such a system may have more moving parts than a pneumatic system (described below), and maintenance of a mechanical structure several kilometers long can be costly, the design of the screw mechanism itself and the constant stirring and grinding it imparts to the thermal material passing through it can be done in a manner that significantly reduces the probability of having the particles of the thermal material clumping together and clogging the shaft.

In some embodiments of the invention, additional components that aid the transport of thermal material through vibration may also be employed. Such devices are available from Martin Engineering of Neponset, Ill. Such vibrating components may be positioned several places along the pneumatic conveyer, as well as at the entrance to the ram screw at the bottom of the well shaft.

After the thermal material has reached the bottom of the mechanical screw system, the final insertion of the salt into the chamber 5080 formed in the Heat Absorption Zone must take place. To facilitate this, some embodiments of the invention may comprise an additional driver 5100 such as a ram screw that drives the thermal material into a chamber 5080 formed in the Heat Absorption Zone situated in the thermal pool 560. The ram screw mechanism should be designed to function under high heat and under some mechanical stress, since the thermal material is expected to become molten as it is driven lower by the ram screw.

As the thermal material progresses into the Earth to the Heat Absorption Zone, it heats up and, if it is a material such as a solid or powdered salt mixture, it will melt and become a liquid at higher temperatures. This melted material 5055 fills or partially fills the thermal chamber 5080, where it continues to absorb heat.

The pressure in the chamber 5080 created by the force on the thermal material provided by the additional driver 5100 pushes the hot material 5055 into the exit pipe 5040, where it proceeds to rise again through the exit pipe 5040 in a second well shaft 5016 to the surface of the Earth 10 and from there into the Heat Transfer Zone in a production facility 5020, where the heat is extracted.

The exit pipe 5040 can surrounded by insulation 5062 for all or part of its length, and be designed as shown in the FIG. 19 and FIG. 20 with decreasing diameters for the cooler sections near the surface of the Earth 10. With the same inflow of material at the base of the exit pipe 5040, the thermal fluid in the sections of the exit pipe 5040 having a smaller diameter will have correspondingly higher velocity, and therefore have less time to cool as it rises to the Heat Transfer Zone. Embodiments in which the exit pipe has a constant diameter, or in which various sections have various diameters may also be designed. In some embodiments, the exit pipe 5040 may also comprise valves which function as "one-way" valves, facilitating the flow in one direction (towards the surface) but closing for flow in the opposite direction.

Once in the Heat Transfer Zone, heat transfer from the thermal material proceeds as in the previously described embodiments. However, in this embodiment, the thermal materials can be cooled all the way down to room temperature, since the material does not need to be in liquid form for re-injection into the first well 5014. If the thermal material is, for example, molten salt, the additional temperature change from its melting point (142° C.) to room temperature (20° C.) can, using the numbers from Table I, represent an additional transfer of 190 kJ of heat per kilogram of material. Once cooled, the cooled thermal material is then suitably prepared, such as by pulverization, and sent again into the pneumatic conveyer system to gather additional heat and repeat the cycle.

As disclosed in the previous embodiments, the well heads and surface circulating system 5018 can be enclosed in a facility 5012 that can be connected to or otherwise integrated with the production facility 5020.

It should be noted that, although the illustrations in FIGS. 19 and 20 show an embodiment with two distinct shafts (one to convey the initial salt down to the Heat Absorption Zone, and the other to provide a channel for the molten salt to rise again to the Heat Transfer Zone) other embodiments may be designed in which both the insertion shaft and the extraction shaft both exist in the same borehole, eliminating the need for the cost of boring a second borehole if none already exists.

The thermal material may comprise a salt or combination of salts, such as, for example, CN—K (Potassium Calcium Nitrate—$KNO_3 5Ca(NO_3)_2 10H_2O$) as offered by Yara International ASA of Norway for use in warmer wells, (e.g. 150° C. to 500° C.). For higher temperatures (e.g. 300° C. to 1000° C.) a salt mixture such as one comprising by weight 50% Potassium Nitrate ($KNO_3$), 40% Sodium Nitrite ($NaNO_2$) and 7% Sodium Nitrate ($NaNO_3$) can be used. The mixtures may contain other salts as well, comprising salts such as sodium fluoride (NaF), sodium chloride (NaCl), potassium fluoride (KF), potassium chloride (KCl) (which melt at even higher temperatures) as long as their proportions are managed to provide appropriate thermal and fluidic properties for the temperature of the thermal pool 560. Mixtures of molten salts used for energy storage and transport in the concentrated solar power (CSP) facilities may also be adapted for use in the embodiments of the invention disclosed here.

Figure 21:
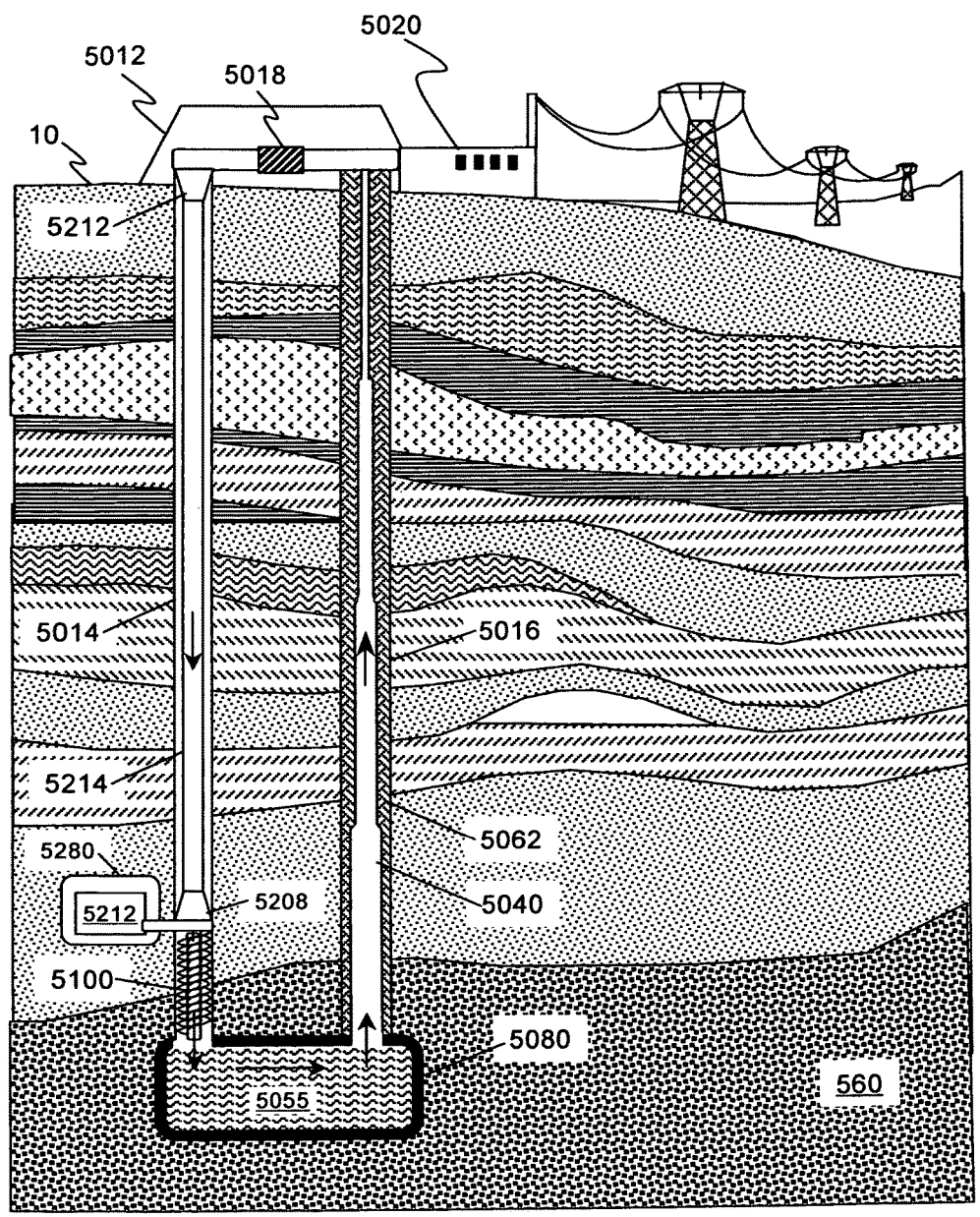
FIG. 21 presents a schematic overview of an embodiment of the invention using a closed loop for a thermal substance and comprising a pneumatic conveying system to transport the thermal substance towards the Heat Absorption Zone.
Figure 22:
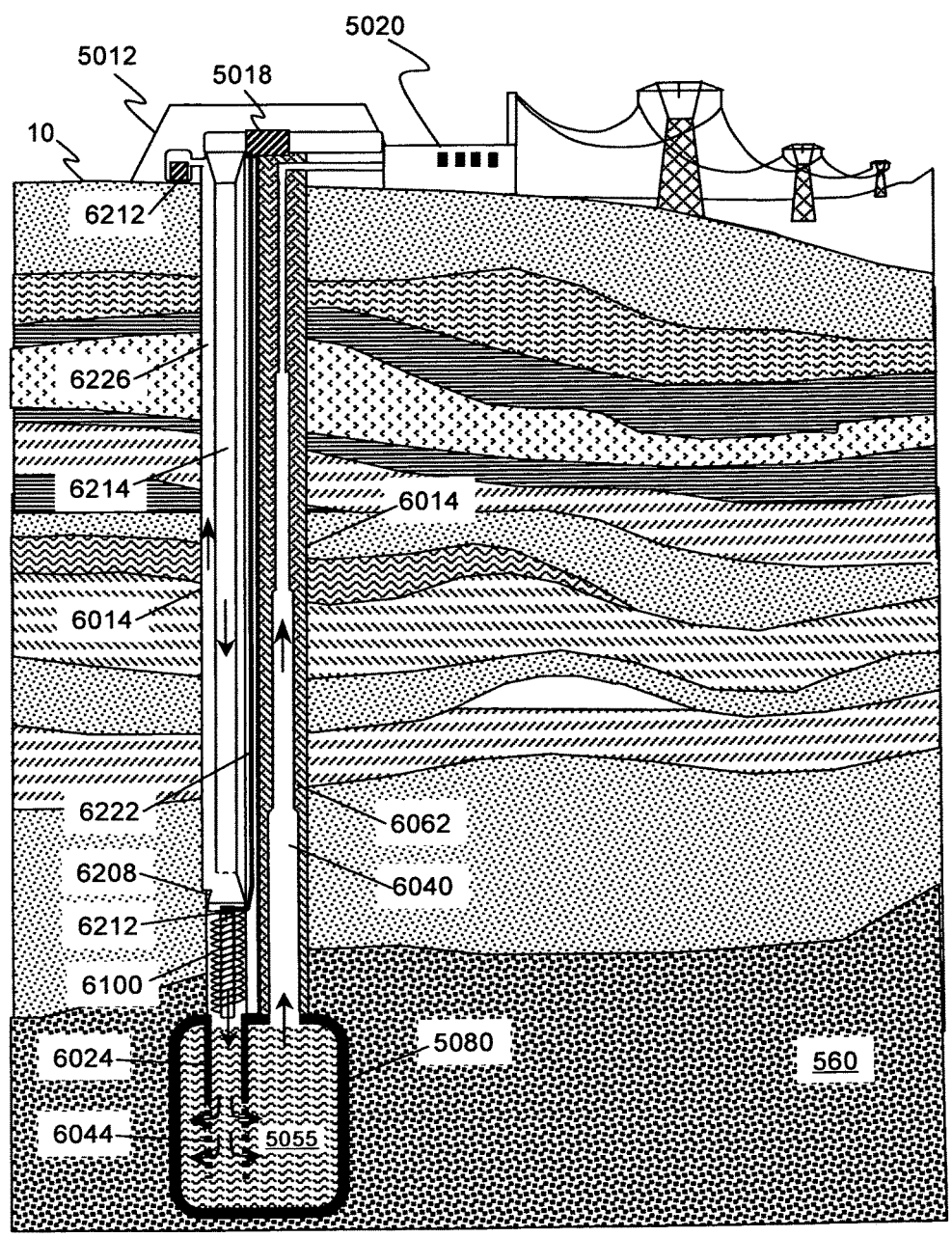
FIG. 22 presents a schematic overview of an embodiment of the invention using a closed loop for a thermal substance and comprising a pneumatic conveying system to transport the thermal substance towards the Heat Absorption Zone.
Figure 23:
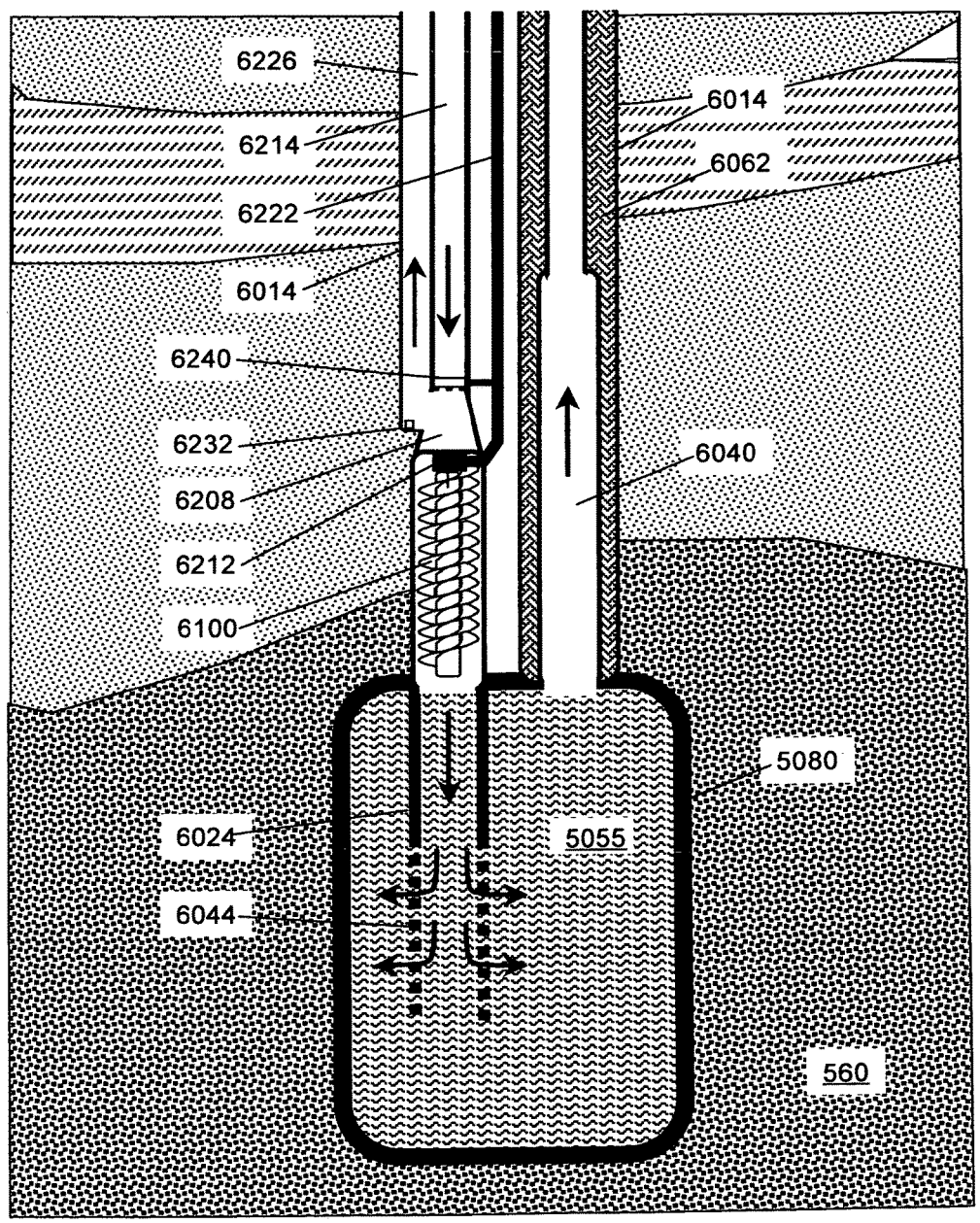
FIG. 23 presents a detailed view of the thermal chamber from the embodiment of the invention presented in FIG. 22.

Another embodiment of the invention is illustrated in FIG. 21, with variations shown in FIGS. 22 and 23. As before, in a facility 5012 built at or near the surface of the Earth 10, a circulating system 5018 directs thermal material into a first well shaft 5014. However, in this embodiment, the well shaft 5014 has been fitted with a pneumatic conveyer system. Such systems, such as those described by David Mills in the book "Pneumatic Conveying Design Guide, $2^{nd}$ Edition" [Elsevier Butterworth-Heinemann, Oxford, UK/Burlington, Mass., 2004] are widely used in mining and other applications requiring material transportation, and it is expected that the specifications for commercially available systems would be adequate for use in this embodiment of the invention.

Such a pneumatic system typically comprises a driving means 5212, for pushing a mixture of particles and air into the system, such as a blower; a pneumatic conveyance 5214, which in this case is a pipe that runs along a portion of the length of the well shaft 5014, and a suction means 5208, which is typically created by a pump 5212. The pump 5212 and other equipment and sensors that may be required to monitor and maintain such a pneumatic conveyer system can be enclosed in a chamber 5280 drilled near the well shaft 5014 that contains the pneumatic conveyance 5214. The pneumatic conveyance 5214 is designed to create a pressure gradient from the surface to the area near the suction means 5208, so that the grains and particles of the thermal material, which can be a solid or powdered version of one of the salt compositions mentioned above, are forcefully pulled down the shaft.

Although more complex than a simple empty well shaft, a pneumatic conveyer system can work better than a simple gravity-driven shaft. In a gravity-driven shaft, in which the particles of salt are under free fall, the various particles may clump together and possibly clog the well shaft 5014, especially if they absorb moisture during their descent. A pneumatic system provides the additional force needed to speed the thermal material on its way to the Heat Absorption Zone.

As in other embodiments described herein, the thermal material may comprise a salt or combination of salts, such as, for example, CN—K (Potassium Calcium Nitrate—$KNO_3 5Ca(NO_3)_2 10H_2O$) as offered by Yara International ASA of Norway for use in warmer wells, (e.g. 150° C. to 500° C.). For higher temperatures (e.g. 300° C. to 1000° C.) a salt mixture such as one comprising by weight 50%

Potassium Nitrate (KNO$_3$), 40% Sodium Nitrite (NaNO$_2$) and 7% Sodium Nitrate (NaNO$_3$) can be used. The mixtures may contain other salts as well, comprising salts such as sodium fluoride (NaF), sodium chloride (NaCl), potassium fluoride (KF), potassium chloride (KCl) (which melt at even higher temperatures) as long as their proportions are managed to provide appropriate thermal and fluidic properties for the temperature of the thermal pool 560. Mixtures of molten salts used for energy storage and transport in the concentrated solar power (CSP) facilities may also be adapted for use in the embodiments of the invention disclosed here.

As in other embodiments described herein, after the thermal material has reached the bottom of the pneumatic conveyer system, the final insertion of the salt into the chamber 5080 in the Heat Absorption Zone must take place. As in the previously described embodiments, this embodiment also may comprise an additional driver 5100 such as a ram screw that drives the thermal material into a chamber 5080 formed in the Heat Absorption Zone situated in the thermal pool 560. As in the previous embodiment, the ram screw mechanism should be designed to function under high heat and under some mechanical stress, since the thermal material is expected to become molten as it is driven lower by the ram screw.

As in other embodiments described herein, the pressure in the chamber 5080 created by the force on the thermal material provided by the additional driver 5100 pushes the hot material 5055 into the exit pipe 5040, where it proceeds to rise again through the exit pipe 5040 in a second well shaft 5016 to the surface of the Earth 10 and from there into the Heat Transfer Zone in a production facility 5020, where the heat is extracted. The cooled thermal material is then suitably prepared, such as by pulverization, and sent again into the pneumatic conveyer system to gather additional heat. It should be noted that, although the illustration in FIG. 21 shows an embodiment with two distinct shafts (one to convey the initial salt down to the Heat Absorption Zone, and the other to provide a channel for the molten salt to rise again to the Heat Transfer Zone), other embodiments may be designed in which both the insertion shaft and the extraction shaft co-exist in the same borehole, eliminating the need for the cost of boring a second borehole if none already exists.

An alternative embodiment with a single borehole and a pneumatic conveyance system is shown in the cross-section diagrams of FIGS. 22 and 23. In this embodiment, a single shaft 6014 has been drilled from the surface of the Earth 10 to the Heat Absorption Zone. In the embodiment as shown, the pump 6212 that creates suction is housed in the facility 5012 at the surface. A portion of the well shaft 6014 will have a pneumatic conveyance 6214 to provide thermal material, such as solid or molten salt, to a chamber 5080 formed in the Heat Absorption Zone situated in the thermal pool 560. A portion of the well shaft 6014 will have an aspiration line 6226 conveying air from lower portions of the shaft 6014. A portion of the shaft 6014 will have an exit pipe 6040.

In some embodiments of the invention, the aspiration line 6226 will be connected in the lower portion of the shaft 6014 using a pressure chamber 6208. When the pump 6212 pumps the aspiration line 6026, the lower pressure created in the pressure chamber 6208 will draw the thermal material down.

In the embodiment as illustrated in FIGS. 22 and 23, this pressure chamber 6208 will be situated above a driver 6100 such as a ram screw that drives the thermal material into a chamber 5080 formed in the Heat Absorption Zone situated in the thermal pool 560. The driver 6100 may be powered by a motor 6212 as long as the motor 6212 can withstand the temperatures at its location within the well shaft 6014. Various sensors, such as a pressure indicator 6232 to monitor the suction, or other sensors to monitor air pressure, temperature, and the flow of thermal material throughout the aspiration line 6226 or the pneumatic conveyance 6214 may also be provided, as well as valves 6240 to control the flow of thermal material as illustrated in FIG. 23. The system may additionally be fitted with various relief valves to normalize pressure as needed. To provide electrical power to the motor 6212 and/or the sensors and/or the various valves, one or more electrical supply cables 6222 may be provided in a portion of the shaft 6014.

As illustrated in FIGS. 22 and 23, the shaft entering the thermal chamber 5080 may additionally comprise a down pipe 6034 that may additionally have permeable sections 6044 that allow the thermal material to enter the thermal chamber 5080 at various elevations within the chamber 5080. It should also be noted that the proportions of the thermal chamber 5088 and down pipe 6034 as illustrated are not intended to be interpreted as accurate dimensions. The chamber may actually be only a few meters in diameter, but several hundred meters deep, and the down pipe 6034 may extend only a few meters into the chamber 5080, or may extend to the bottom of the chamber 5080.

As the thermal material progresses into the chamber 5080 in the Heat Absorption Zone, it heats up and, if it is a material such as a solid or powdered salt mixture, it will melt and become a liquid at higher temperatures. As in the previous embodiment, the ram screw mechanism should be designed to function under high heat and under some mechanical stress, since the thermal material is expected to become molten as it is driven lower by the ram screw. This melted material 5055 fills or partially fills the thermal chamber 5080, where it continues to absorb heat.

The pressure in the chamber 5080 created by the force on the thermal material provided by the additional driver 6100 pushes the hot material 5055 into the exit pipe 6040, where it proceeds to rise again through the exit pipe 6040 in the well shaft 6014 to the surface of the Earth 10, and from there into the Heat Transfer Zone in a production facility 5020 where the heat is extracted.

The exit pipe 6040 can be surrounded by insulation 6062 for all or part of its length, and be designed as was shown in the previously described embodiments of FIG. 19 and FIG. 20, with decreasing diameters for the cooler sections near the surface of the Earth 10. With the same inflow of material at the base of the exit pipe 6040, the thermal fluid in the sections of the exit pipe 6040 having a smaller diameter will have correspondingly higher velocity, and therefore have less time to cool as it rises to the Heat Transfer Zone. Embodiments in which the exit pipe has a constant diameter, or in which various sections have various diameters may also be designed. In some embodiments, the exit pipe 6040 may also comprise valves which function as "one-way" valves, facilitating the flow in one direction (towards the surface) but closing for flow in the opposite direction.

A Single Shaft Embodiment of the Invention with a Heat Exchanger

Figure 24:
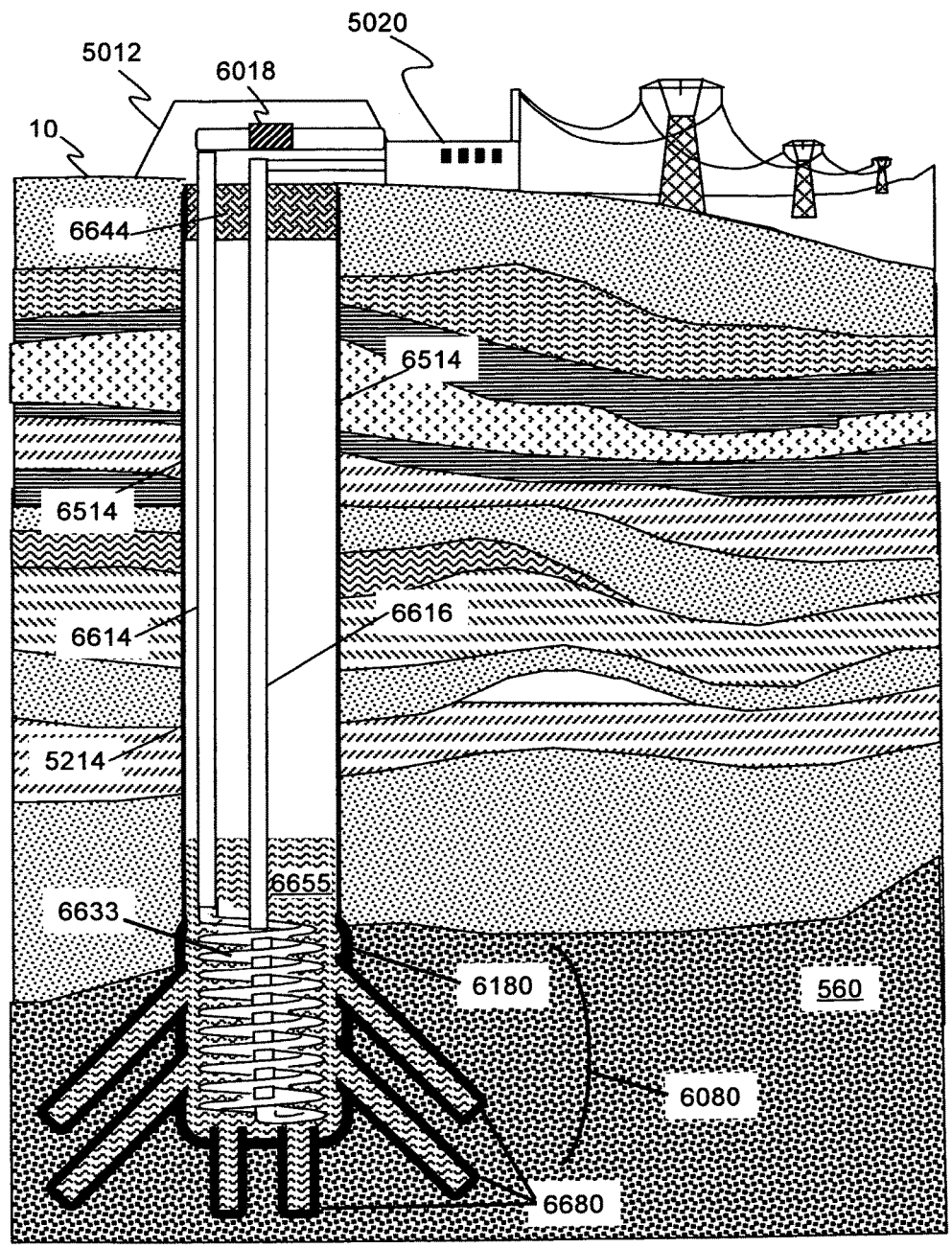
FIG. 24 presents a schematic overview of an embodiment of the invention using a closed loop for a thermal substance and comprising a heat exchanger in the Heat Absorption Zone.

An alternative embodiment with a single borehole is shown in the cross-section diagram of FIG. 24. In this embodiment, a single shaft 6514 has been drilled from the surface of the Earth 10 to the Heat Absorption Zone, situated in the thermal pool 560. As illustrated in FIG. 24, in a facility

5012 built at or near the surface of the Earth 10, a circulating system 6018 (which may comprise a grinder or chopper to pulverize large chunks of thermal material) directs thermal material such as molten salt into a down pipe 6514 that conveys the thermal material to a chamber 6080 formed in a Heat Absorption Zone situated in a thermal pool 560.

In the embodiment as shown, the thermal chamber 6080 at the bottom of the shaft comprises one large chamber 6180 and several side wells 6680 drilled into the rock of the thermal pool 560. The bottom of the chamber 6180 and the side wells 6680 have been filled with a thermal immersion material 6655 such as a molten salt. To prevent heat from escaping from this pool, an insulating cap 6644 may be placed over the shaft or within the shaft at some elevation. Within this pool of thermal material 6655, a heat exchanger 6633 has been placed, comprising tubes or piping that allows thermal material flowing down the down pipe 6614 to acquire heat. The thermal material then rises to the surface of the Earth 10 through an exit pipe 6616, and then moves on into the Heat Transfer Zone in a production facility 5020 where the heat is extracted.

As with the other embodiments already described, the illustration of FIG. 24 is not meant to be a literal description of the proportions of the chambers, but is a representation of how to make and use the invention. The actual depth of the well 6514 may be kilometers deep, while the diameter of the well shaft 6514 and the thermal chamber 6080 may be 1 meter in diameter or smaller, or may be as large as 30 meters or more in diameter. Likewise, the side wells may be small passages less than a meter in diameter and tens or hundreds of meters long, or may be larger in diameter and shorter in length. There may be only a few, as illustrated, or as many as a hundred or more side wells.

It should also be noted that, although the illustration of FIG. 24 shows a single shaft 6514 comprising a down pipe 6614 and an exit pipe 6616 that provides a circulating flow of thermal material, such as molten salt, to the production facility 5020, geographic layouts in which several shafts simultaneously provide a flow of heated thermal material into a central processing facility may also be constructed according to the invention. These may be arranged in a regular geographic array, or be irregularly distributed over a landscape to best conform to the local topography and geographic strata.

Embodiments of the Invention Using Energy Storage

In the embodiments of the invention described so far, heat energy is transferred from inside the Earth to produce electricity or otherwise do useful work. However, for a deep well, considerable energy may be required to haul a heavy thermal mass out of a well. Some of the potential energy that exists for a thermal mass at the top of a well may be captured as the thermal mass descends into the well.

Likewise, as disclosed above, once the heat energy has been harvested, it can be stored as molten salt. It can be stored in a pool for later use, or packaged into smaller tanks for transportation to remote locations, where the heat can be locally harvested. However, transport of molten salt over distances can be problematic, since the material is a very hot liquid and can be corrosive. Transfer of the heat to a solid, such graphite, for storage may present a more efficient method for heat energy transport.

A. Storage as Electricity.

Figure 26:
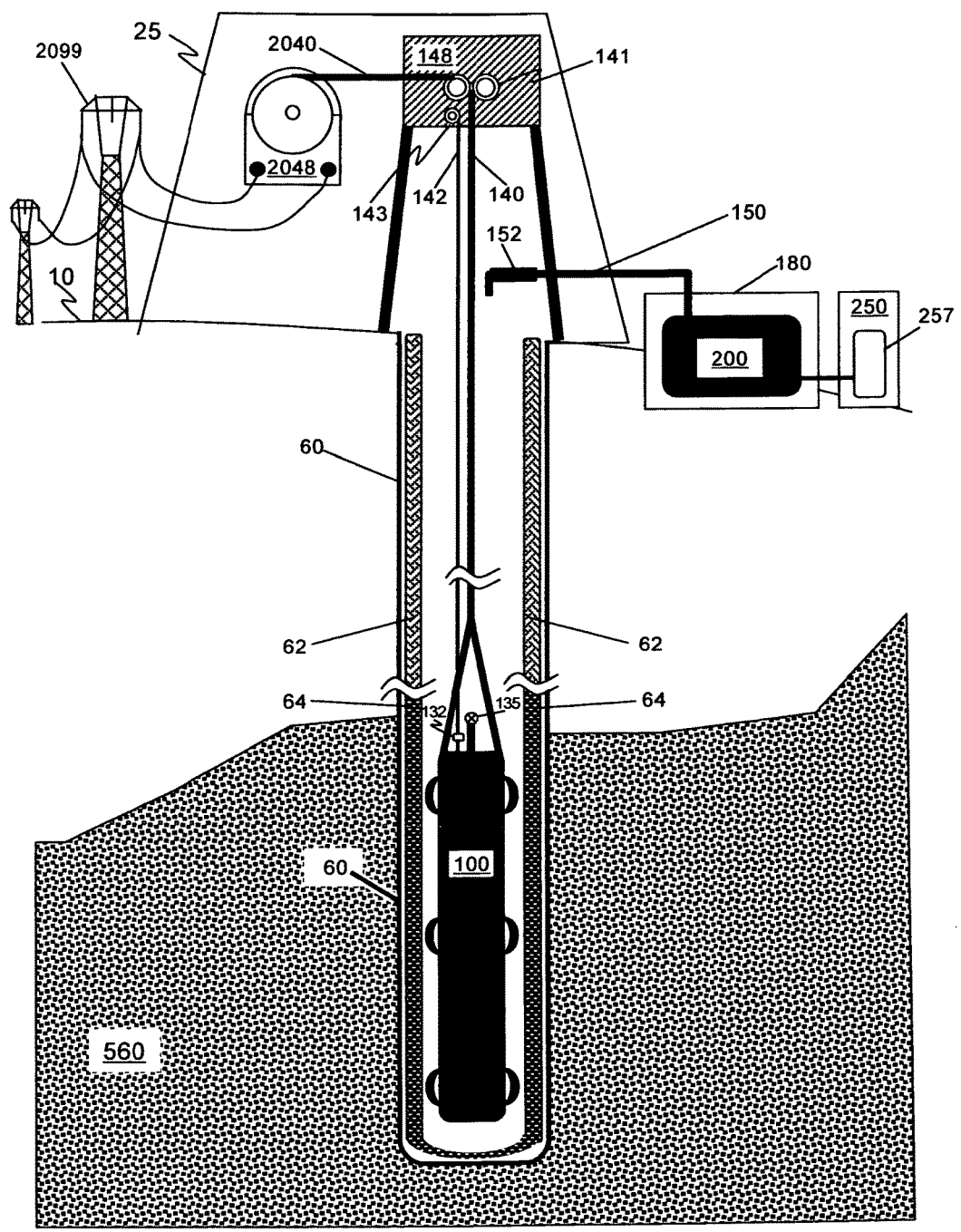
FIG. 26 illustrates an embodiment of the invention in which the energy from a generator is supplied to an electrical grid.

FIG. 26 illustrates one embodiment of the invention, in which the cable mechanism at the top of the well shaft 60 is connected through a coupling 2040 to an electric generator 2048. As the thermal mass 100 descends into the well shaft 60, the cable turns the drive shaft of the generator 2048, and electricity is produced. The electric generator 2048 can be coupled to an external power grid 2099, and the excess power generated from the descent of the thermal mass 100 will be sent to the electrical grid 2099 as it is generated.

When the time comes to raise the thermal mass 100, the electrical generator 2048 can be reversed and driven as a motor to pull the thermal mass 100 up the well shaft 60. The power to raise the thermal mass can be drawn from the electrical grid 2099, assuming the electrical grid 2099 remains connected and is available to supply the energy.

Figure 27:
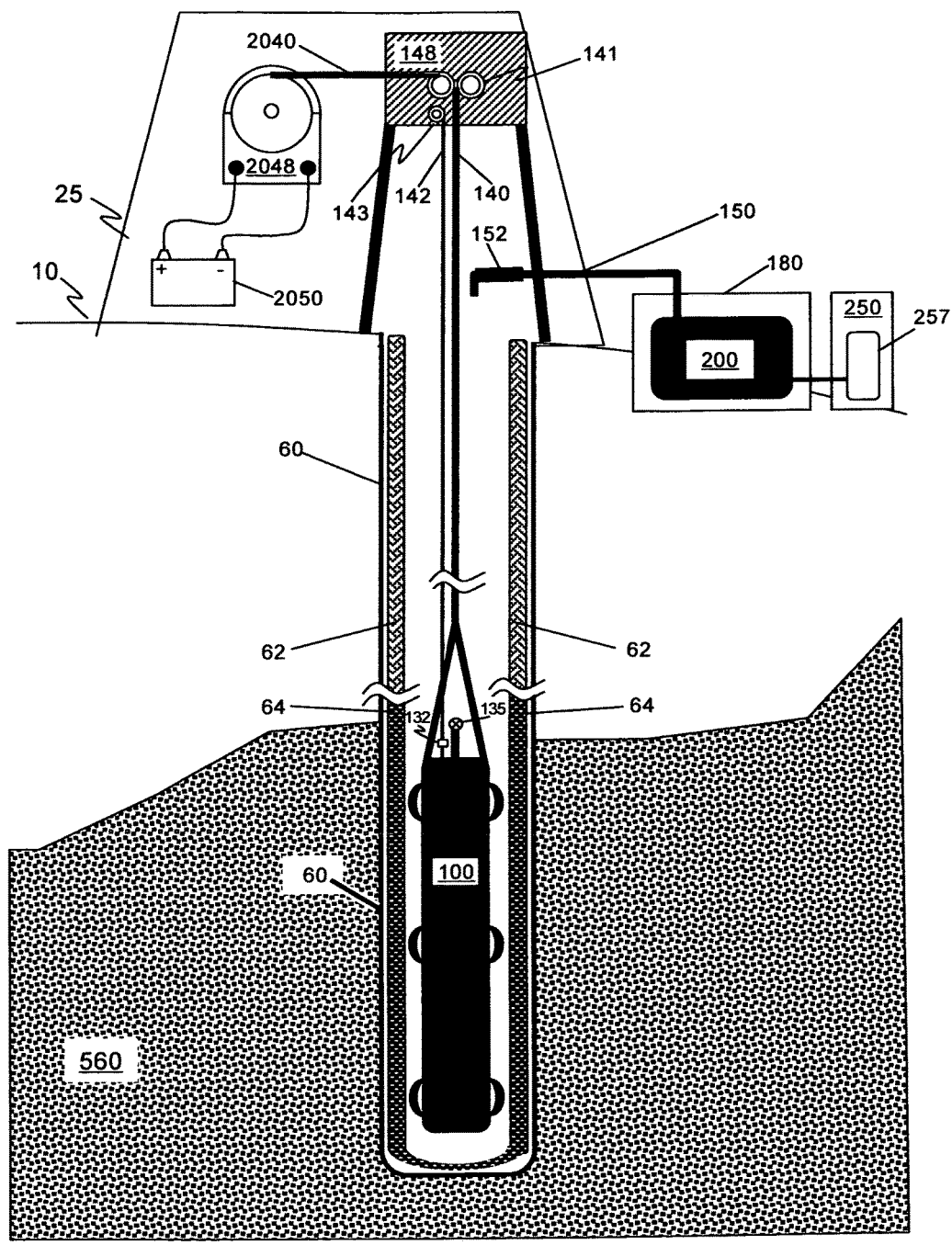
FIG. 27 illustrates an embodiment of the invention in which the energy from a generator is supplied to a battery.

In an alternative embodiment, illustrated in FIG. 27, the generator 2048 is instead connected to a rechargeable battery 2050 that is used as an energy storage system. As the thermal mass 100 descends into the well shaft 60, the electricity produced by the generator 2048 is now used to charge a battery 2050. When the time comes to raise the thermal mass 100, the electrical generator 2048 can be reversed and driven as a motor by the energy stored in the battery 2050 to pull the thermal mass 100 up the well shaft 60.

Energy conversion from mechanical energy to electrical energy is not perfect, and the subsequent reverse conversion from stored electricity back to mechanical energy can be similarly inefficient. It is therefore clear that the energy from the descent of the thermal mass stored as electricity alone will not be enough to actually pull the thermal mass all the way out of the heat well. Access to a supplemental source of power, either from the power grid of from an additional battery, may therefore be used to augment the energy stored as electricity.

B. Storage as Compressed Air.

The energy of the descent of the thermal mass under gravity may also be used as mechanical energy to run a compressor, in which the potential energy of the thermal mass at the surface is converted into pressurized air, stored in a tank. The energy stored as pressure in the tank can then be used to provide some of the energy needed to raise the thermal mass up the well shaft.

C. Storage with Graphite.

Another storage issue associated with embodiments of the invention is that geothermal energy brought up from the Heat Absorption Zone needs to be unloaded and held in the Heat Transfer Zone until it can be utilized. As was illustrated, for example, in FIG. 5, some embodiments of the invention use molten salt 55 in the thermal mass 100, and, in the Heat Transfer Zone, unload that molten salt 55 and store it in a thermal reservoir 200. In some embodiments, the heat energy is processed on site. In some embodiments, the hot molten salt can be transferred to smaller, insulated tanks, and transported or shipped to some other remote location, where the heat will be locally extracted and used. (The word "remote" here is intended to only mean at some distance from the geothermal well, and not necessarily far from a center of population.) However, the salts used for heat acquisition and transfer can be expensive, and keeping the salt in storage when it could be launched onto another thermal mass to collect more geothermal energy may not be the most cost effective use of resources.

Figure 28:
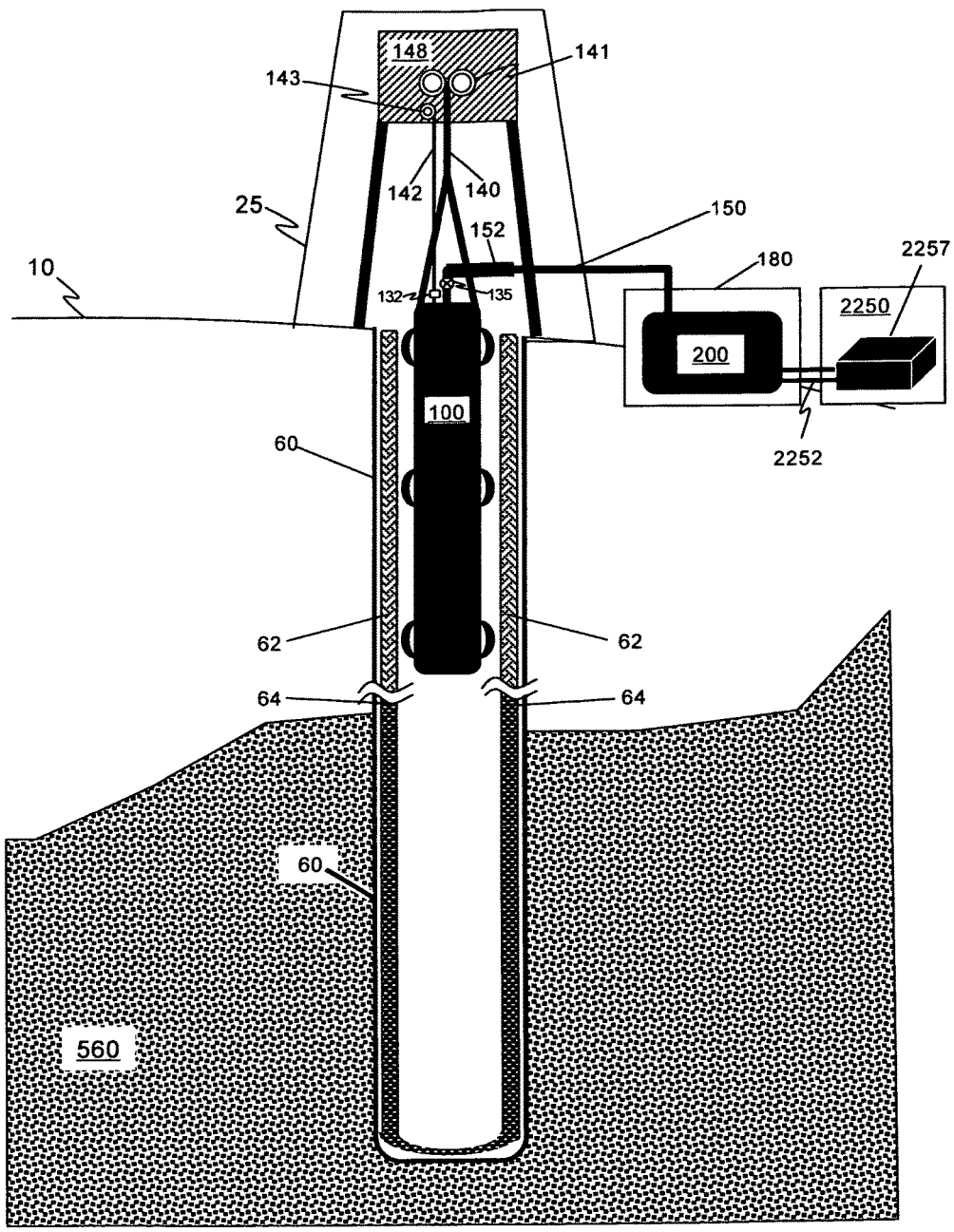
FIG. 28 illustrates an embodiment of the invention in which the energy from the thermal reservoir is transferred to a graphite block.

As illustrated in FIG. 28, in one embodiment of the invention, the thermal reservoir 200 can provide heat in the form of molten salt through piping 2252 to a production facility 2250, where it is transferred to a block or pod made of graphite 2257. This graphite block or pod 2257 need not be a simple block of material, but can have structures formed within the graphite, and in particular, the structures can comprise channels for flowing molten salt. Graphite blocks for heat storage are being developed for the concentrated solar power (CSP) industry, and graphite blocks for solar collectors are under development by the American company Graffech International of Parma, Ohio, in collaboration with the Spanish engineering firm SENER, and also by the Australian company Graphite Energy. Graphite blocks for storing heat generated by electricity are disclosed in U.S. Pat. No. 8,056,341 (METHOD AND APPARATUS FOR STORING HEAT ENERGY", invented by S. Hamer, S. Hollis, E. Gentle, and H. Dutt, and assigned to Lardken Pty Ltd. of Australia.)

Graphite is an appealing material because large quantities with high purity can be made inexpensively, and graphite has a high thermal conductivity, low emissivity, and a substantial heat capacity (the thermal energy density is approximately 1,500 kJ/(m$^3$° C.), as compared with 2,600 kJ/(m$^3$° C.) for molten salt). It is also stable up to temperatures as high as 1,650° C. (whereas most molten salt mixtures are limited for use under 600° C.).

One embodiment of graphite as a storage medium comprises having a graphite pod, or block, with channels created inside the pod that can allow molten salt to flow through the graphite pod. These channels may be in a regular grid, a serpentine pattern, or any other arrangement deemed to facilitate heat transfer. As the molten salt passes through the pod, heat is transferred from the molten salt to the graphite pod. Once heated, the connection to the thermal fluid can be disconnected and the fluid drained from the pod. The graphite pod will then be removed and can be kept in an insulated environment to preserve its heat. The heat can be later extracted by passing a gas or liquid through the channels in the graphite pod. If the liquid is water, the water can turn to steam in a controlled and predictable manner, and be used to drive a turbine or other local power generation system.

In some embodiments, the graphite pod can be of a size suitable to fit in the trunk of a car, and be used to provide motive energy for the vehicle if a suitable transfer mechanism to couple the thermal energy is provided that allows this to function as a power source on demand. One such mechanism can be an array of thermoelectric chips, which convert a temperature difference into an electrical voltage. Other mechanisms can comprise a water/steam mechanism that direct water into the hot graphite pod and uses the steam generated in a steam turbine to generate power. This can be similar to a Cyclone steam engine, produced by Cyclone Power technologies of Pompano Beach, Fla. Larger graphite pods or arrays of multiple pods can be used to power larger vehicles such as trucks and busses or boats and ships, assuming a suitable power transfer mechanism can be installed.

In some embodiments, a vehicle equipped with a graphite block or pod for motive power can also be equipped with an electrical battery to provide an additional source of propulsion. This graphite/electrical hybrid vehicle would be able to travel farther than a vehicle powered by a hot block of graphite alone, and the use of a battery as a backup would allow charging when no additional source of heat for the graphite is available.

In some embodiments, the graphite block or pod can additionally comprise electrical resistive heaters which can be used to heat the block in the case that it becomes too cool and that the molten salt passing through the block freezes in place before exiting the block.

In some embodiments, the thermal mass itself can be manufactured in whole or in part from graphite, allowing its temperature to rise significantly higher than a comparable molten salt thermal mass. This may be especially suitable for wells in which the thermal pool is over 1000° C. In this case, however, the heat transfer at the surface would be carried out by detaching the thermal mass once it had been heated. The thermal reservoir will therefore be designed to store the graphite thermal masses as they are brought up from the geothermal well, and not be designed as a reservoir for hot liquids.

Additional Uses and Limitations

With this application, several embodiments of the invention, including the best mode contemplated by the inventors, have been disclosed. It will be recognized that, while specific embodiments may be presented, elements discussed in detail only for some embodiments may also be applied to others.

It will also be recognized that, while generating electricity is a common end use for the heat produced by these embodiments in the Heat Transfer Zone, other industrial processes, such as electrolysis of water for the generation of hydrogen and oxygen; or such as pyrolysis of organic materials for the generation of "Syngas" or for waste processing; or the direct generation of mechanical energy using a steam turbine; or for the heating of objects for industrial smelting, baking, or curing processes, may all be driven by the geothermal heat harvested according to the invention. It will also be recognized that the thermal mass can comprise additional chambers and constructions designed to facilitate some or all of the steps of these industrial processes while the thermal mass is still present into the Heat Absorption Zone. Other processes and end uses for the geothermal heat that may be known to those skilled in the art.

While specific materials, designs, configurations and fabrication steps have been set forth to describe this invention and the preferred embodiments, such descriptions are not intended to be limiting. Modifications and changes may be apparent to those skilled in the art, and it is intended that this invention be limited only by the scope of the appended claims.

What is claimed is:

1. A method for extracting geothermal energy from the Earth, comprising the steps of:
   lowering a quantity of molten salt or a combination of suitable salts ("salt") into a geothermal heat absorption zone, wherein the lowering includes:
      moving the quantity of salt using a pneumatic conveyer system having a ram screw and an aspiration line that conveys suction to the heat absorption zone;
   heating the quantity of salt in the geothermal heat absorption zone, the quantity of salt heated by absorbing heat from the geothermal heat absorption zone;
   raising the quantity of salt to a heat transfer zone; and
   transferring the quantity of salt into a thermal reservoir.

2. The method of claim 1, additionally comprising:
   extracting the heat from the salt in the thermal reservoir; and
   returning a portion of the cooled salt to the geothermal heat absorption zone.

3. The method of claim 1, in which the quantity of salt is initially in solid form, and in which heating the quantity of salt comprises melting the salt.

4. The method of claim 3, in which the solid form of the salt is a powder.

5. The method of claim 1, in which the step of raising the quantity of salt uses a pipe with multiple diameters.

6. The method of claim 1, in which the pneumatic conveyer system has a source of suction within a well shaft.

7. The method of claim 1, in which the pneumatic conveyer system comprises a source of high pressure air.

8. The method of claim 7, in which the source of high pressure air is an air compressor.

9. The method of claim 1, in which: the pneumatic conveyer system comprises a source of suction near the surface of the Earth.

10. The method of claim 1, in which the quantity of salt comprises potassium nitrate.

11. A system for extracting heat from a geothermal well, comprising:
- a down pipe to provide a thermal material, comprising molten salt or a combination of salts suitable for a geothermal well, to a heat absorption zone in the geothermal well, wherein the thermal material is provided to the heat absorption zone using a pneumatic conveyer system having a ram screw and an aspiration line that conveys suction to the heat absorption zone;
- a heat exchanger positioned within the heat absorption zone, the thermal material gaining heat by absorbing heat from the geothermal well;
- an exit pipe to bring the thermal material to a heat transfer zone; and
- a means in the heat transfer zone to extract the heat from the thermal material.

12. The system of claim 11, in which: the down pipe is connected to the heat exchanger, such that the thermal material can move from the down pipe into the heat exchanger; and the heat exchanger is connected to the exit pipe, such that the thermal material can move from the heat exchanger to the exit pipe.

13. The system of claim 12, in which the thermal material comprises salt.

14. The system of claim 13, in which the salt comprises potassium nitrate.

15. The system of claim 13, in which the thermal material in the exit pipe is a molten salt.

16. The system of claim 12, in which a portion of the heat absorption zone additionally comprises a quantity of thermal transfer fluid to facilitate transfer of heat from the Earth to the heat exchanger.

17. The system of claim 16, in which the thermal transfer fluid is a molten salt.

18. The system of claim 11, further comprising an apparatus for storing the extracted heat, said apparatus comprising: a body of graphite, in which one or more channels have been formed.

19. The method of claim 1, wherein the quantity of salt is molten salt and wherein transferring the quantity of salt further comprises transferring the molten salt into channels formed in a graphite body; removing the molten salt from the graphite body; and insulating the graphite body after the transfer has been completed.

20. The system of claim 18, wherein the heated body of graphite is configured to be mounted within a vehicle and to provide motive power to the vehicle.

21. The system of claim 15, further comprising a container wherein the molten salt is stored and wherein the container is configured to be mounted within a vehicle to provide motive power to the vehicle.

22. The method of claim 1, wherein transferring the quantity of salt into a thermal reservoir further comprises transferring at least a portion of the heated salt into an insulated storage container; transporting the insulated storage container containing the heated salt to a remote location; and extracting the heat from the heated salt at the remote location.

23. The method of claim 22, in which the heated salt is a molten salt.

24. The method of claim 22, in which the heated salt comprises potassium nitrate.

25. The system of claim 11, further comprising:
- a molten salt pump to pump liquefied molten salt from an operating facility at surface level to a geothermal heat/energy source and then back to the operating facility after acquiring a significant increase in heat/energy for conversion into electricity, for conversion into compressible fuel gases, for use in industrial processes, or for use in mechanical processes.

* * * * *